(12) United States Patent
Cheng et al.

(10) Patent No.: US 9,627,712 B2
(45) Date of Patent: Apr. 18, 2017

(54) HETEROAROMATIC-BASED ELECTROLYTES FOR LITHIUM AND LITHIUM-ION BATTERIES

(71) Applicant: UCHICAGO ARGONNE, LLC, Chicago, IL (US)

(72) Inventors: Gang Cheng, Naperville, IL (US); Daniel P. Abraham, Bolingbrook, IL (US)

(73) Assignee: UCHICAGO ARGONNE, LLC, Chicago, IL (US)

(*) Notice: Subject to any disclaimer, the term of this patent is extended or adjusted under 35 U.S.C. 154(b) by 384 days.

(21) Appl. No.: 14/179,051

(22) Filed: Feb. 12, 2014

(65) Prior Publication Data

US 2014/0220417 A1    Aug. 7, 2014

Related U.S. Application Data

(62) Division of application No. 12/888,920, filed on Sep. 23, 2010, now abandoned.

(51) Int. Cl.
*H01M 10/05* (2010.01)
*H01M 10/052* (2010.01)
(Continued)

(52) U.S. Cl.
CPC ..... *H01M 10/052* (2013.01); *H01M 10/0525* (2013.01); *H01M 10/0567* (2013.01);
(Continued)

(58) Field of Classification Search
None
See application file for complete search history.

(56) References Cited

U.S. PATENT DOCUMENTS

| 6,503,643 B1 | 1/2003 | Heuer et al. |
| 2002/0025477 A1 | 2/2002 | Itagaki et al. |

(Continued)

FOREIGN PATENT DOCUMENTS

| JP | 2001-266939 | * | 9/2001 | ............ H01M 10/40 |
| JP | 2003115324 | | 4/2003 | |
| JP | 2005-347222 | * | 12/2005 | ............ H01M 10/40 |
| JP | 2008091589 | | 4/2008 | |
| JP | 2008091589 A | | 4/2008 | |

OTHER PUBLICATIONS

Pomerantz, M. et al., Poly(alkyl Thiophene-3-carboxylates). Synthesis, Properties and Electroluminescence Studies of a Polythiophene with a Carbonyl Group Attached to the Ring, Synthetic Metals 85 (1997) 1235-1236.
(Continued)

*Primary Examiner* — Ula C Ruddock
*Assistant Examiner* — Tony Chuo
(74) *Attorney, Agent, or Firm* — Olson & Cepuritis, Ltd.

(57) ABSTRACT

The present invention provides an electrolyte for lithium and/or lithium-ion batteries comprising a lithium salt in a liquid carrier comprising heteroaromatic compound including a five-membered or six-membered heteroaromatic ring moiety selected from the group consisting of a furan, a pyrazine, a triazine, a pyrrole, and a thiophene, the heteroaromatic ring moiety bearing least one carboxylic ester or carboxylic anhydride substituent bound to at least one carbon atom of the heteroaromatic ring. Preferred heteroaromatic ring moieties include pyridine compounds, pyrazine compounds, pyrrole compounds, furan compounds, and thiophene compounds.

11 Claims, 19 Drawing Sheets

(51) Int. Cl.
*H01M 10/0525* (2010.01)
*H01M 10/0567* (2010.01)
*H01M 10/0568* (2010.01)
*H01M 10/0569* (2010.01)

(52) U.S. Cl.
CPC ... *H01M 10/0568* (2013.01); *H01M 10/0569* (2013.01); *H01M 2300/0028* (2013.01)

(56) References Cited

U.S. PATENT DOCUMENTS

2003/0157413 A1* 8/2003 Chen .................. H01M 10/052
429/326
2007/0196740 A1 8/2007 Haruna et al.

OTHER PUBLICATIONS

Mubarak, M.M., Electrochemical Reduction of 2-thiophenecarbonyl Chloride at Carbon and Mercury Cathodes in Acetonitrile, Journal of Electroanalytical Chemistry 394 (1995) 239-243.
Bulut, U. et al., Synthesis, Characterization and Electrochromic Properties of Conducting Copolymers of 3-[(3-thienylcarbonyl)oxy]-2,2-bis{[(3-thienylcarbonyl)oxy]}propyl 3-thiophene Carboxylate with Thiophene and Pyrrole, Reactive & Functional Polymers 61 (2004) 63-70.

* cited by examiner

■ Heteroaromatics containing main group VI elements, such as O and S

2-Ethyl furoate (2-EF)   3-Ethyl furoate (3-EF)   2-Ethyl thiophenecarboxylate (2-ETC)

R₁ : Alkyls, Alkenyls, Alkynyls, F, fluorinated derivatives

R₂ : Alkyls, Alkenyls, Alkynyls and their fluorinated derivatives

Additives induce significant changes in dQ/dV data
Peaks between 1.8 and 3V associated with reactions at graphite.

HETEROAROMATIC-BASED ELECTROLYTES FOR LITHIUM AND LITHIUM-ION BATTERIES

CROSS-REFERENCE TO RELATED APPLICATIONS

This application is a divisional of U.S. Ser. No. 12/888,920, filed on Sep. 23, 2010, which is incorporated herein by reference in its entirety.

CONTRACTUAL ORIGIN OF THE INVENTION

The United States Government has rights in this invention pursuant to Contract No. DE-AC02-06CH11357 between the United States Government and UChicago Argonne, LLC representing Argonne National Laboratory.

FIELD OF THE INVENTION

This invention relates to electrolytes for lithium and lithium-ion batteries. More specifically this invention relates to electrolytes comprising a heteroaromatic compound bearing a carboxylic ester or carboxylic anhydride substituent on the heteroaromatic moiety of the compound, which are useful in lithium and lithium-ion batteries.

BACKGROUND OF THE INVENTION

Recent advances in cathode and anode materials have refocused attention on electrolytes as the technological bottleneck limiting the operation and performance of lithium-battery systems. Attributes such as cell potential and energy density are related to the intrinsic property of the positive and negative electrode materials, while cell power density, calendar-life and safety are dictated by the nature and stability of the electrolyte and the electrode-electrolyte interfaces. A wide electrochemical window, wide temperature stability range, non-reactivity with the other cell components, non-toxicity, low cost, and a lithium-ion transference number approaching unity are, in general, desirable characteristics for lithium battery electrolytes. In addition, the electrolyte should have excellent ionic conductivity to enable rapid ion transport between the electrodes, and be an electronic insulator to minimize self-discharge and prevent short-circuits within the cell. Various carbonate solvents such as dimethylcarbonate (DMC), ethylmethylcarbonate (EMC), ethylene carbonate (EC), propylene carbonate (PC), and mixtures of two or more of such carbonates, have been utilized as a solvent for lithium salts in lithium batteries and lithium-ion batteries. Research on electrolytes and on functional electrolyte additives to improve cell life, thermal abuse behavior and low-temperature (e.g., <0° C.) performance of lithium-ion cells is ongoing. Consequently, there is a need for new electrolyte solvents for use in lithium and lithium ion batteries. The compositions of the present invention address this need.

SUMMARY OF THE INVENTION

The present invention provides an electrolyte composition for lithium and/or lithium-ion batteries comprising a lithium salt in a liquid carrier comprising heteroaromatic compound including a five-membered or six-membered heteroaromatic ring moiety comprising carbon atoms and at least one heteroatom forming a neutral aromatic ring, the at least one heteroatom being selected from a Group V element (preferably N) and a Group VI element (preferably O or S), the heteroaromatic ring moiety bearing at least one carboxylic ester or carboxylic anhydride substituent bound to at least one carbon atom of the heteroaromatic ring. Preferred heteroaromatic ring moieties include pyridine compounds, pyrazine compounds, pyrrole compounds, furan compounds, and thiophene compounds.

Preferred carboxylic ester substituents include methyl, ethyl propyl, isopropyl, and butyl esters. Suitable anhydride substituents include internal anhydrides in which the two carbonyl groups of the anhydride are bound to adjacent carbon atoms of the heteroaromatic moiety, or mixed anhydrides in which one carbonyl of the anhydride is bound to the heteroaromatic moiety and the other carbonyl is bound to an alkyl group such as a methyl, ethyl, propyl, or butyl group, an alkenyl group, an alkynyl group, an aromatic hydrocarbon group, or a fluorinated derivative thereof.

The composition can include one heteroaromatic compound or more than one. The heteroaromatic compound can be the exclusive organic solvent component of the electrolyte, or can be included in any proportion with one or more other solvent suitable for use in lithium and/or lithium-ion batteries, such as ethylene carbonate, propylene carbonate, and the like. Preferred heteroaromatic compounds for use in the electrolyte compositions of the present invention are liquids at ambient room temperature, and are stable over a wide temperature range that may be encountered in lithium and lithium-ion batteries (e.g., −30 to +50° C.). The preferred heteroaromatic components typically have a wide range of electrochemical stability (e.g., 0 V to 5V), and exhibit excellent ionic conductivity. Many of the heteroaromatic components also are low cost, have relatively low toxicity, and relatively low flammability compared to many conventional electrolyte solvents.

DETAILED DESCRIPTION OF THE PRESENT INVENTION

Figure 1:
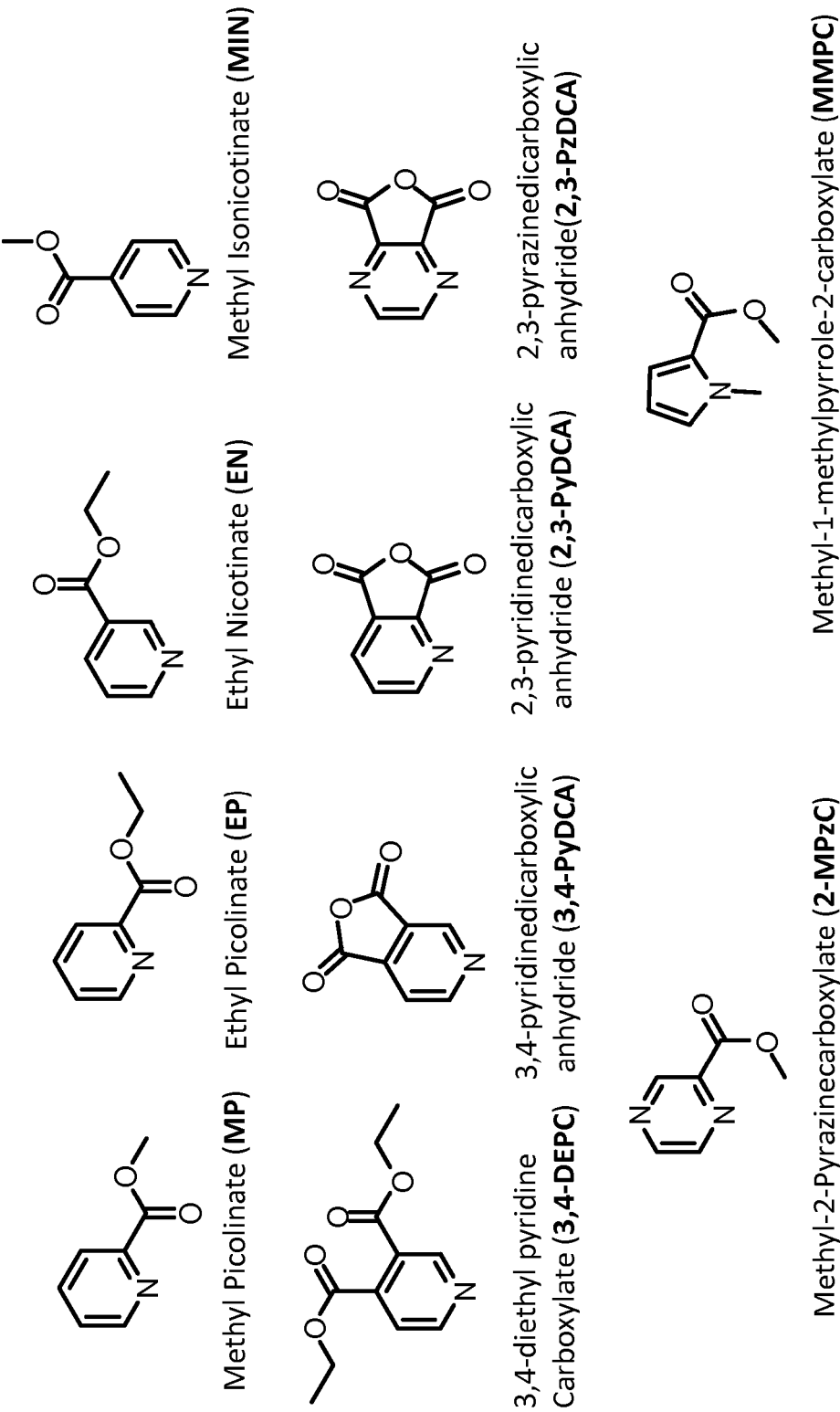
FIG. 1 provides non-limiting examples of heteroaromatic compounds useful in the electrolyte compositions of the present invention.

The present invention provides novel electrolyte compositions for use in lithium and lithium ion batteries. The compositions comprise a lithium salt in a liquid carrier containing a heteroaromatic compound bearing a carboxylic acid or carboxylic anhydride substituent.

The heteroaromatic component of the electrolytes of the present invention comprises a five-membered or six-membered heteroaromatic ring moiety comprising carbon atoms and at least one heteroatom forming a neutral aromatic ring, the at least one heteroatom being selected from a Group V element and a Group VI element, the heteroaromatic ring moiety bearing least one carboxylic ester or carboxylic anhydride substituent bound to at least one carbon atom of the heteroaromatic ring. Preferred heteroatoms include, without limitation, N, O, and S. In some preferred embodiments, the heteroaromatic component can be a 5-membered or 6-membered ring heteroaromatic compound of the general Formula (I):

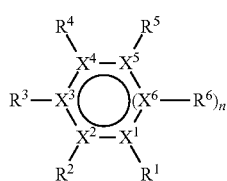

wherein:

each of the X atoms, $X^1$, $X^2$, $X^3$, $X^4$, $X^5$, and $X^6$, independently is C or a heteroatom selected from a Group V element (preferably N) and a Group VI element (preferably O or S), at least two of the X atoms are C atoms, and at least one of the X atoms is a heteroatom, with the provisos that: (a) the R substituent, $R^1$, $R^2$, $R^3$, $R^4$, $R^5$, and $R^6$, on a C atom independently is selected from the group consisting of H, alkyl (preferably $C_1$ to $C_4$ alkyl), alkenyl, alkynyl, aryl, arylalkyl, fluoroalkyl, fluoroalkenyl, fluoroalkynyl, fluoroaryl, fluoroarylalkyl, a carboxylic anhydride, and a carboxylic ester selected from the group consisting of an alkyl ester (preferably $C_1$ to $C_4$ alkyl), an alkenyl ester, an alkynyl ester, an aryl ester, an arylalkyl ester, a fluoroalkyl ester, a fluoroalkenyl ester, a fluoroalkynyl ester, a fluoroaryl ester, and a fluoroarylalkyl ester; (b) any R substituent on a heteroatom independently is absent or is selected from the group consisting H, alkyl (preferably $C_1$ to $C_4$ alkyl), alkenyl, alkynyl, aryl, arylalkyl, fluoroalkyl, fluoroalkenyl, fluoroalkynyl, fluoroaryl, and fluoroarylalkyl; (c) the combination of X atoms and R substituents forms a neutral aromatic ring; and (d) optionally, R substituents on two adjacent C atoms together form a cyclic carboxylic anhydride group;

at least one R substituent on a C atom is selected from a carboxylic ester and a carboxylic anhydride; and n is 0 or 1; with the provisos that (i) when n is 1, then the heteroatom is a Group V element, and (ii) when n is 0, then $X^1$ and $X^5$ are joined by a covalent bond.

In a preferred embodiment, one or two R substituents on a C atom of the compound of Formula (I) is selected from a carboxylic ester and a carboxylic anhydride, or two adjacent R substituents on C atoms together form a cyclic anhydride, the remainder of the R substituents on carbon atoms are H, and R substituents on heteroatoms are either absent, or are selected from H, and $C_1$ to $C_4$ alkyl.

Non-limiting examples of some heteroaromatic compounds of Formula (I) include pyridine, pyrazine, triazine, pyrrole, furan, and thiophene compounds. Non-limiting examples of some preferred heteroaromatic compounds are set forth in general Formulas (II), (III), (IV), (V), and (VI). Non-limiting examples of some specific heteroaromatic compounds useful in the electrolytes of the present invention are shown in FIGS. 1 to 5, including specific compounds of Formulas (I), (II), (III), (IV), (V), and (VI).

Some preferred heteroaromatic compounds comprising a pyridine heteroaromatic moiety are represented by general Formula (II):

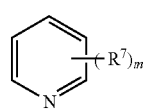

wherein:

m is 1, 2, 3, 4, or 5; each $R^7$ is attached to a carbon atom of the pyridine moiety and independently is selected from the group consisting of alkyl (preferably $C_1$ to $C_4$ alkyl), alkenyl, alkynyl, aryl, arylalkyl, fluoroalkyl, fluoroalkenyl, fluoroalkynyl, fluoroaryl, fluoroarylalkyl, a carboxylic anhydride, and a carboxylic ester selected from the group consisting of an alkyl ester (preferably $C_1$ to $C_4$ alkyl), an alkenyl ester, an alkynyl ester, an aryl ester, an arylalkyl ester, a fluoroalkyl ester, a fluoroalkenyl ester, a fluoroalkynyl ester, a fluoroaryl ester, and a fluoroarylalkyl ester; optionally $R^7$ substituents on two adjacent C atoms together form a cyclic carboxylic anhydride group; and the compound bears at least one $R^7$ substituent selected from carboxylic anhydride and a carboxylic ester. In a preferred embodiment, m is 1, 2 or 3, and each $R^7$ substituent of the compound of Formula (II) is selected from a carboxylic ester and a carboxylic anhydride, or two adjacent $R^7$ substituents together form a cyclic anhydride. Preferably, the carboxylic ester is a $C_1$ to $C_4$ alkyl ester.

Some preferred heteroaromatic compounds comprising a pyrazine heteroaromatic moiety are represented by general Formula (III):

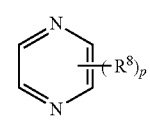

wherein p is 1, 2, 3, or 4; each $R^8$ is attached to a carbon atom of the pyrazine moiety and independently is selected from the group consisting of alkyl (preferably $C_1$ to $C_4$ alkyl), alkenyl, alkynyl, aryl, arylalkyl, fluoroalkyl, fluoroalkenyl, fluoroalkynyl, fluoroaryl, fluoroarylalkyl, a carboxylic anhydride, and a carboxylic ester selected from the group consisting of an alkyl ester (preferably $C_1$ to $C_4$ alkyl), an alkenyl ester, an alkynyl ester, an aryl ester, an arylalkyl ester, a fluoroalkyl ester, a fluoroalkenyl ester, a fluoroalkynyl ester, a fluoroaryl ester, and a fluoroarylalkyl ester; optionally $R^8$ substituents on two adjacent C atoms together form a cyclic carboxylic anhydride group; and the compound bears at least one $R^8$ substituent selected from a carboxylic anhydride and a carboxylic ester. In a preferred embodiment, p is 1 or 2, and each $R^8$ substituent of the compound of Formula (III) is selected from a carboxylic ester and a carboxylic anhydride, or two adjacent $R^8$ substituents together form a cyclic anhydride. Preferably, the carboxylic ester is a $C_1$ to $C_4$ alkyl ester.

Preferred heteroaromatic compounds comprising a pyrrole heteroaromatic moiety are represented by general Formula (IV):

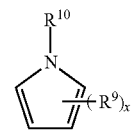

wherein x is 1, 2, 3, or 4; each $R^9$ is attached to a carbon atom of the pyrrole moiety and independently is selected from the group consisting of alkyl (preferably $C_1$ to $C_4$ alkyl), alkenyl, alkynyl, aryl, arylalkyl, fluoroalkyl, fluoroalkenyl, fluoroalkynyl, fluoroaryl, fluoroarylalkyl, a carboxylic anhydride, and a carboxylic ester selected from the group consisting of an alkyl ester (preferably $C_1$ to $C_4$ alkyl), an alkenyl ester, an alkynyl ester, an aryl ester, an arylalkyl ester, a fluoroalkyl ester, a fluoroalkenyl ester, a fluoroalkynyl ester, a fluoroaryl ester, and a fluoroarylalkyl ester; optionally $R^9$ substituents on two adjacent C atoms together form a cyclic carboxylic anhydride group;

$R^{10}$ is selected from the group consisting of H, alkyl (preferably $C_1$ to $C_4$ alkyl), alkenyl, alkynyl, aryl, arylalkyl, fluoroalkyl, fluoroalkenyl, fluoroalkynyl, fluoroaryl, and fluoroarylalkyl; and and the compound bears at least one $R^9$ substituent selected from a carboxylic anhydride and a carboxylic ester. In a preferred embodiment, x is 1 or 2, and each $R^9$ substituent of the compound of Formula (IV) is selected from a carboxylic ester and a carboxylic anhydride, or two adjacent $R^9$ substituents together form a cyclic anhydride, and $R^{10}$ is either H or $C_1$ to $C_4$ alkyl. Preferably, the carboxylic ester is a $C_1$ to $C_4$ alkyl ester.

Some preferred heteroaromatic compounds comprising a furan heteroaromatic moiety are represented by general Formula (V):

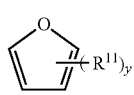

(V)

wherein y is 1, 2, 3, or 4; each $R^{11}$ is attached to a carbon atom of the furan moiety and independently is selected from the group consisting of alkyl (preferably $C_1$ to $C_4$ alkyl), alkenyl, alkynyl, aryl, arylalkyl, fluoroalkyl, fluoroalkenyl, fluoroalkynyl, fluoroaryl, fluoroarylalkyl, a carboxylic anhydride, and a carboxylic ester selected from the group consisting of an alkyl ester (preferably $C_1$ to $C_4$ alkyl), an alkenyl ester, an alkynyl ester, an aryl ester, an arylalkyl ester, a fluoroalkyl ester, a fluoroalkenyl ester, a fluoroalkynyl ester, a fluoroaryl ester, and a fluoroarylalkyl ester; optionally $R^{11}$ substituents on two adjacent C atoms together form a cyclic carboxylic anhydride group; and the compound bears at least one $R^{11}$ substituent selected from a carboxylic anhydride and a carboxylic ester. In a preferred embodiment, y is 1 or 2, and each $R^{11}$ substituent of the compound of Formula (V) is selected from a carboxylic ester and a carboxylic anhydride, or two adjacent $R^8$ substituents together form a cyclic anhydride. Preferably, the carboxylic ester is a $C_1$ to $C_4$ alkyl ester.

Some preferred heteroaromatic compounds comprising a thiophene moiety heteroaromatic are represented by general Formula (VI):

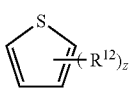

(VI)

wherein z is 1, 2, 3, or 4; each $R^{12}$ is attached to a carbon atom of the thiophene moiety and independently is selected from the group consisting of alkyl (preferably $C_1$ to $C_4$ alkyl), alkenyl, alkynyl, aryl, arylalkyl, fluoroalkyl, fluoroalkenyl, fluoroalkynyl, fluoroaryl, fluoroarylalkyl, a carboxylic anhydride, and a carboxylic ester selected from the group consisting of an alkyl ester (preferably $C_1$ to $C_4$ alkyl), an alkenyl ester, an alkynyl ester, an aryl ester, an arylalkyl ester, a fluoroalkyl ester, a fluoroalkenyl ester, a fluoroalkynyl ester, a fluoroaryl ester, and a fluoroarylalkyl ester; optionally $R^{12}$ substituents on two adjacent C atoms together form a cyclic carboxylic anhydride group; and the compound bears at least one $R^{12}$ substituent selected from a carboxylic ester and a carboxylic anhydride. In a preferred embodiment, z is 1 or 2, and each $R^{12}$ substituent of the compound of Formula (VI) is selected from a carboxylic ester and a carboxylic anhydride, or two adjacent $R^{12}$ substituents together form a cyclic anhydride. Preferably, the carboxylic ester is a $C_1$ to $C_4$ alkyl ester.

As used herein, the term "alkyl" refers to a saturated hydrocarbon group, preferably comprising 1 to about 22 carbon atoms (more preferably 1 to 4 carbon atoms), which can be in a linear chain or branched. The term "alkenyl", as used herein refers to hydrocarbon group, preferably comprising 2 to about 22 carbon atoms (more preferably 2 to 4 carbon atoms), which can be in a linear chain or branched, and which includes at least one carbon-carbon double bond. The term "alkynyl", as used herein refers to hydrocarbon group, preferably comprising 2 to about 22 carbon atoms (more preferably 2 to 4 carbon atoms), which can be in a linear chain or branched, and which includes at least one carbon-carbon triple bond. As used herein, the term "aryl" refers to an aromatic hydrocarbon group, preferably comprising a phenyl or naphthyl group, which optionally can be substituted with one or more alkyl groups. The term "arylalkyl", as used herein, refers to an alkyl group substituted with an aryl group. The prefix "fluoro" as applied to an alkyl, alkenynl, alkynyl, aryl, or alkylaryl group, indicates that one or more hydrogen atoms of the specified group is replace by a fluorine atom.

Figure 2:
FIG. 2 provides non-limiting examples of heteroaromatic compounds useful in the electrolyte compositions of the present invention.
Figure 3:
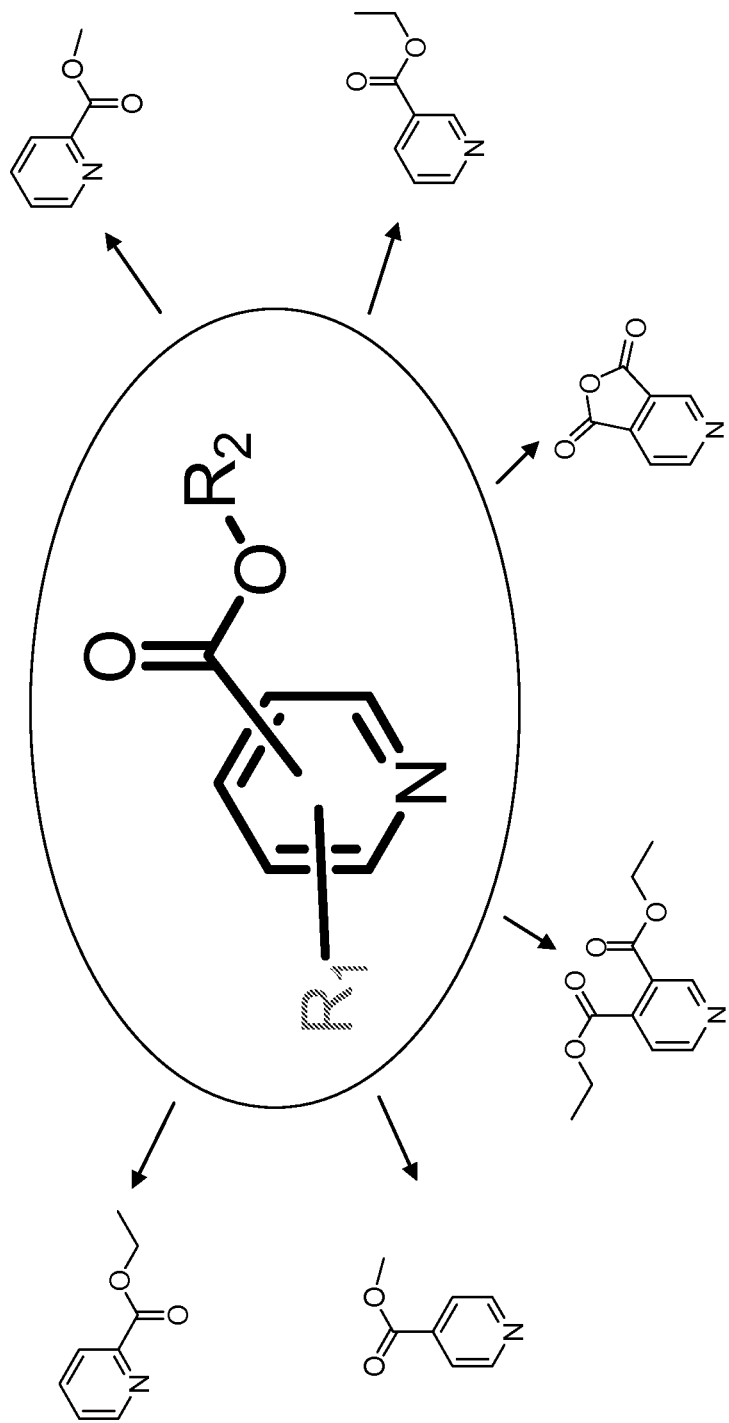
FIG. 3 provides non-limiting examples of heteroaromatic compounds useful in the electrolyte compositions of the present invention.
Figure 4:
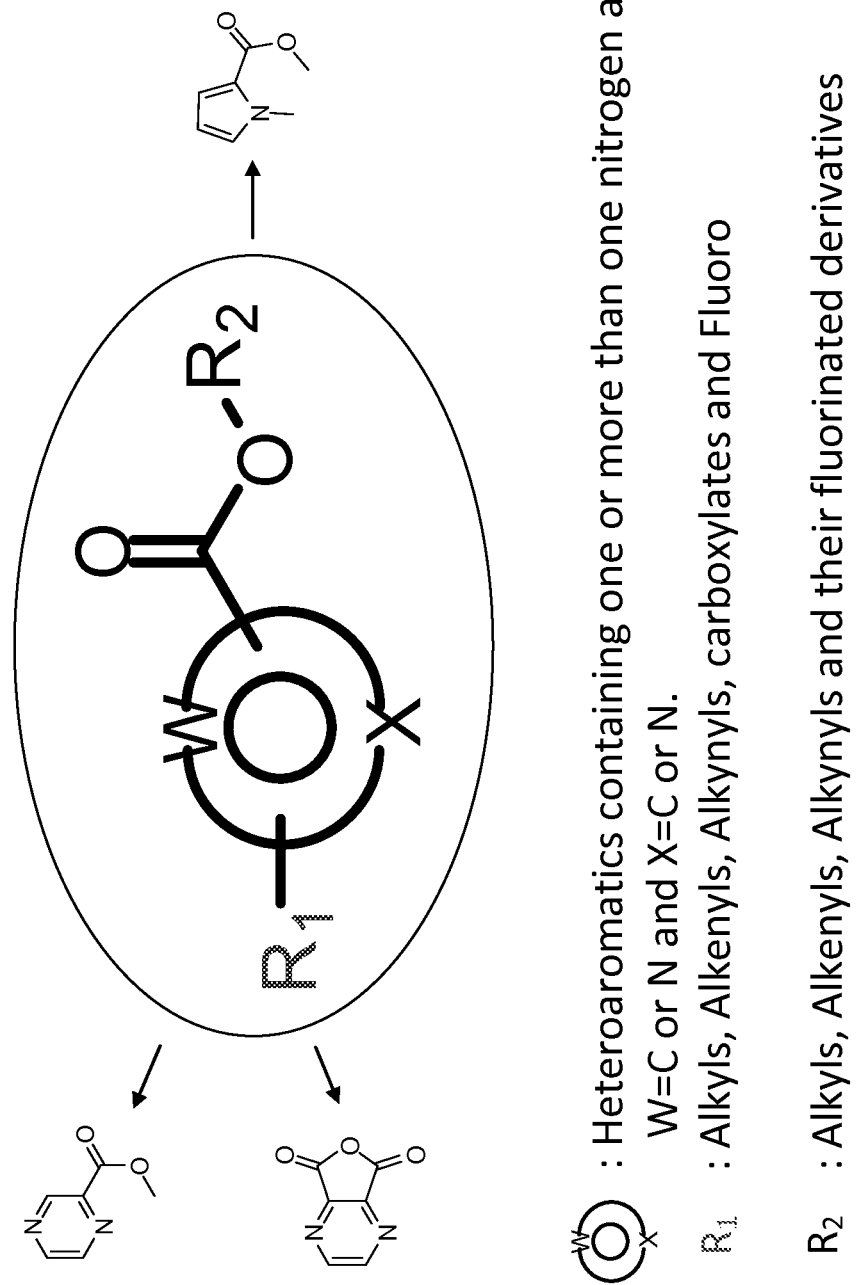
FIG. 4 provides non-limiting examples of heteroaromatic compounds useful in the electrolyte compositions of the present invention.
Figure 5:
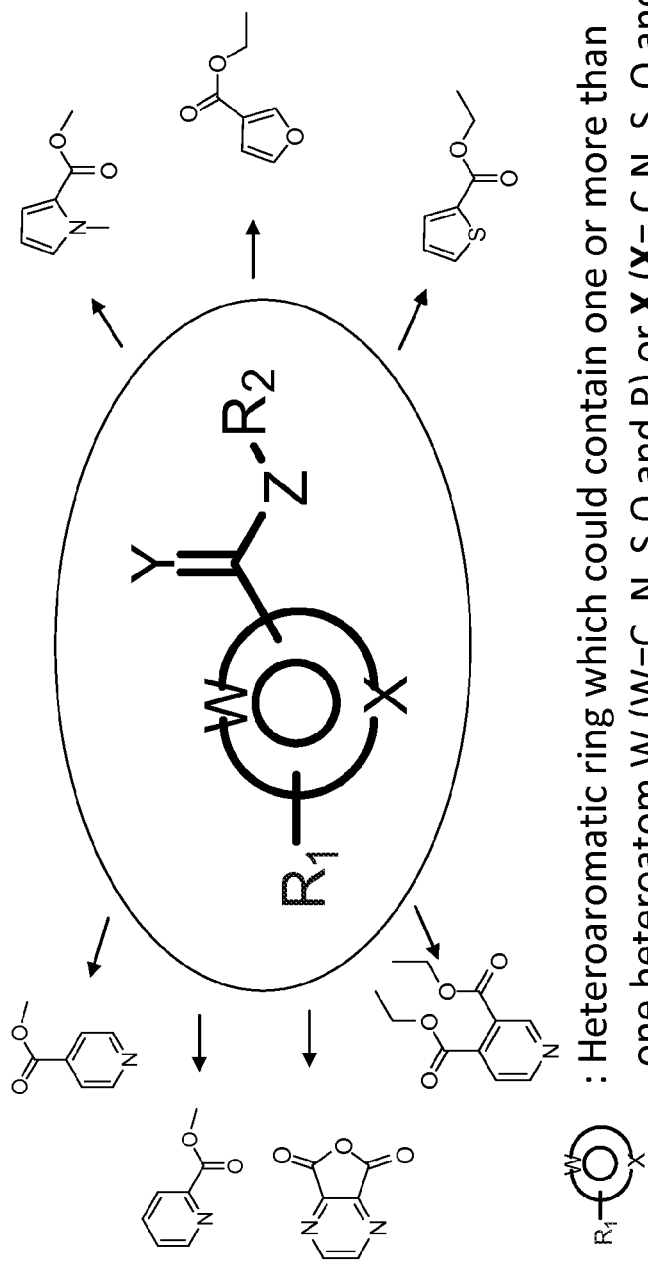
FIG. 5 provides non-limiting examples of heteroaromatic compounds useful in the electrolyte compositions of the present invention.

Non-limiting, specific examples of nitrogen heteroaromatic compounds useful in the electrolytes and electrochemical cells of the present invention are illustrated in FIG. 1: methyl picolinate (MP), ethyl picolinate (EP), ethyl nicotinate (EN), methyl isonicotinate (MIN), 3,4-diethyl pyridinecarboxylate (3,4-DEPC), 3,4-diethyl pyridinecarboxylic anhydride (3,4-PyDCA), 2,3-pyridinecarboxylic anhydride (2,3-PyDCA), 2,3-pyrazinecarboxylic anhydride (2,3-PzDCA), methyl-2-pyrazinecarboxylate (2-MPzC), and methyl-1-methylpyrrole-2-carboxylate (MMPC). FIG. 2 illustrates some furan and thiophene heteroaromatic compounds of use in the electrolytes and electrochemical cells of the invention: 2-ethyl furoate (2-EF), 3-ethyl furoate (3EF), and 2-ethyl thiophenecarboxylate (2-ETC). Various pyridine heteroaromatic compounds of use in the electrolytes and electrochemical cells of the invention are shown generically in FIG. 3. FIG. 4 generically illustrates various pyrazine and pyrrole heteroaromatic compounds of use in the electrolytes and electrochemical cells of the invention. FIG. 5 generically illustrates various nitrogen, sulfur, oxygen, and phosphorus heteroaromatic compounds of use in the electrolytes and electrochemical cells of the invention.

Lithium salts suitable for use in the present invention include any lithium salt or combination of salts that can be used in a lithium or lithium ion battery cell. Non-limiting examples of some suitable lithium salts include $LiPF_6$, $LiBF_4$, $LiF_2BC_2O_4$, $LiB(C_2O_4)_2$, $LiClO_4$, $LiAsF_6$, $LiN(SO_2CF_3)_2$, $LiC(SO_2CF_3)_3$, $LiSO_3CF_3$, and $LiPF_3(CF_2CF_3)_3$. The concentration of lithium salt in the electrolyte composition can be any concentration suitable for used as an electrolyte in a lithium or lithium ion cell. Preferably, the concentration of lithium salt in the carrier is in the range of about 0.1 molar (M) to about 5 molar, more preferably about 1 M to about 1.5 M (e.g., about 1.2 M).

In addition to the heteroaromatic compound, the liquid carrier can include one or more other solvents suitable for use in lithium and lithium ion cell electrolyte compositions. Non-limiting examples of such addition solvents include ethylene carbonate, propylene carbonate, dimethylcarbonate, and ethylmethylcarbonate, as well as combinations of two or more such carbonates. Non-limiting examples of other solvents that have been utilized in lithium ion batteries, and which can be incorporated in the electrolytes of the present invention, include esters (e.g., gamma-butyrolactone, methyl formate, methyl acetate), ethers (e.g., diethoxyethane, tetrahydrofuran, 2-methyltetrahydrofuran, 1,3-dioxane), nitriles (e.g., acetonitrile), sulfolanes, and the like. In some preferred embodiments, the liquid carrier comprises the heteroaromatic compound and at least one additional organic solvent, preferably an organic carbonate solvent, wherein the weight ratio of heteroaromatic compound-to-the at least one additional solvent is in the range of about 1:100 to about 100:1. In other preferred embodiments, the liquid carrier comprises the heteroaromatic compound and at least additional solvent wherein the weight ratio of heteroaromatic compound-to-the at least one additional solvent is in the range of about 1:10 to about 10:1.

The electrolyte compositions of the present invention are particularly useful in an electrochemical cell in combination with an anode and a cathode. Any anode or cathode suitable for use in lithium and/or lithium ion electrochemical cells can be utilized in the cells of the present invention. A preferred anode comprises carbon (e.g., graphite particles, carbon nanoparticles, carbon nanotubes, or a combination thereof), a metal oxide compound, or a combination thereof. A preferred cathode comprises lithium or a lithium compound (e.g., a lithium-bearing layered oxide compound such as $LiNi_{0.8}Co_{0.15}Al_{0.05}O_2$). A battery of the present invention comprises a plurality of such electrochemical cells arranged in series, in parallel, or both. Typically, the anode and cathode compartments of the cells are separated by an electrolyte-permeable membrane, as is well known in the art. The cathodes and anodes also typically include metallic current collectors (e.g., aluminum and copper) on which the cathode and anode active components are coated, also as is well known in the art. The electrolyte can include one or more other organic solvents suitable for use in a lithium or lithium ion electrochemical cell.

The following non-limiting examples are provided to better illustrate certain aspects of the present invention.

EXAMPLE 1

An electrolyte composition designated as Gen2 was prepared, comprising 1.2 M $LiPF_6$ in a 3:7 (w/w) mixture of ethylene carbonate (EC) and ethyl methyl carbonate (EMC) Electrolytes of the invention were prepared by adding about 0.3 wt % of either methyl picolinate (MP) or ethyl picolinate (EP) to the Gen2 electrolyte. The electrolytes were then evaluated in an electrochemical cell including a cathode comprising a 35 micron thick coating of $Li_{0.08}Co_{0.15}Al_{0.05}O_2$ on an aluminum collector plate, an anode comprising a 35 micron thick coating of 5 micron graphite particles on a copper collector plate, and a 25 micron CELGARD® 3501 separator membrane.

Figure 6:
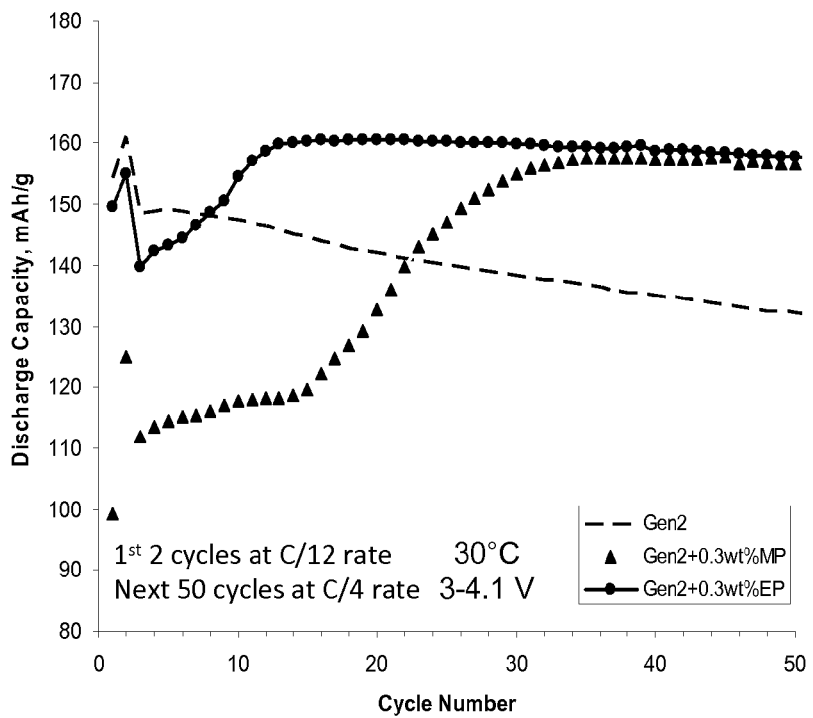
FIG. 6 is a plot of discharge capacity versus cycle number for electrochemical cells utilizing an electrolyte of the invention comprising about 0.3 wt % of either methyl picolinate or ethyl picolinate, compared to a control electrolyte without any heteroaromatic compound present.

FIG. 6 is a plot of discharge capacity versus cycle number for electrochemical cells at 30° C. over a 3 to 4.1 V range for the electrolytes containing 0.3 wt % of MP or EP compared to the Gen2 control. The 1st and seconds cycles were run at a C/12 rate, and the next 50 cycles were run at a C/4 rate. The results in FIG. 6 demonstrate that small amounts of MP or EP added to the Gen2 electrolyte improves capacity retention over the long term (at least up to 50 charge/discharge cycles).

Figure 7:
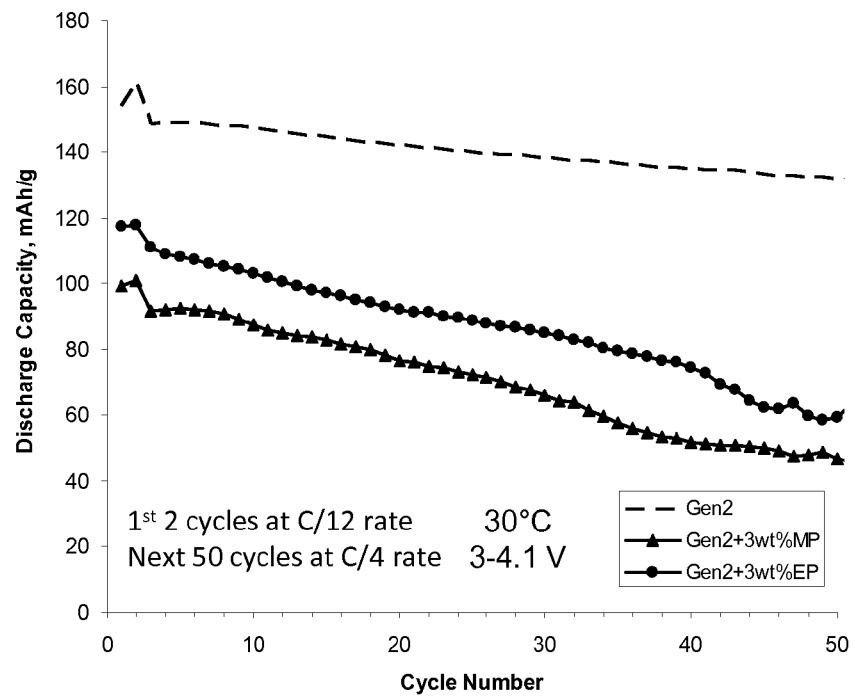
FIG. 7 is a plot of discharge capacity versus cycle number for electrochemical cells utilizing an electrolyte of the invention comprising about 3 wt % of either methyl picolinate or ethyl picolinate, compared to a control electrolyte without any heteroaromatic compound present.

FIG. 7 is a plot of discharge capacity versus cycle number for electrochemical cells utilizing about 3 wt % of either MP or EP, compared to a control the Gen2 control. The results in FIG. 7 indicate that larger amounts of MP and EP (i.e., 3 wt % versus 0.3 wt %) resulted in lower capacity and poorer capacity retention.

EXAMPLE 2

Figure 8:
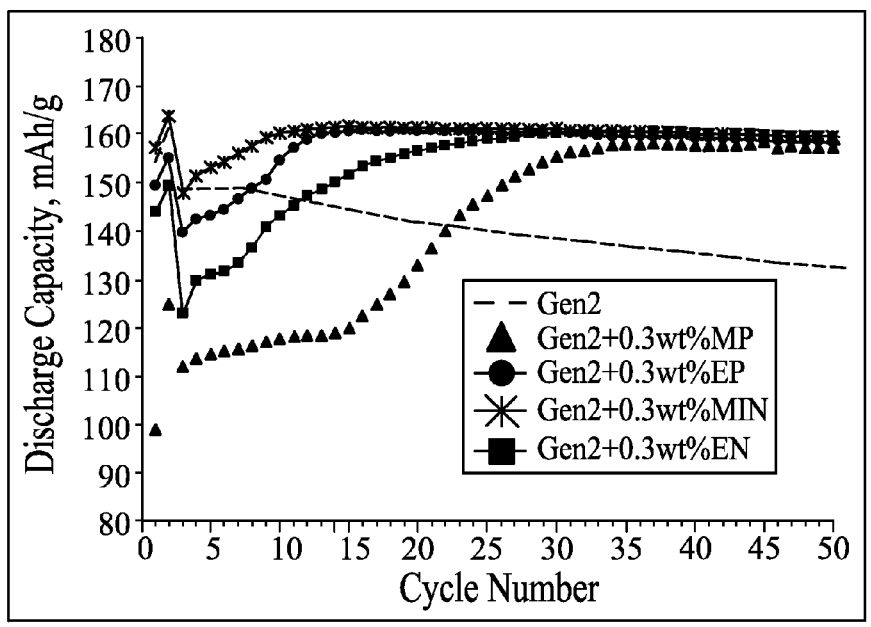
FIG. 8 is a plot of discharge capacity versus cycle number for electrochemical cells utilizing an electrolyte of the invention comprising about 0.3 wt % of various pyridine heteroaromatic compounds, compared to a control electrolyte without any heteroaromatic compound present.

Electrolytes containing about 0.3 wt % of either MP, EP, methyl isonicotinate (MIN), or ethyl nicotinate (EN) added to the Gen2 electrolyte of Example 1 were evaluated in a cell of the same design as described in Example 1. FIG. 8 is a plot of discharge capacity versus cycle number for the electrochemical cells, which shows that addition of 0.3 wt % of the heteroaromatic additives to the Gen2 electrolyte improved the retention capacity relative to the Gen2 electrolyte. MIN provided the least initial capacity loss.

Figure 9:
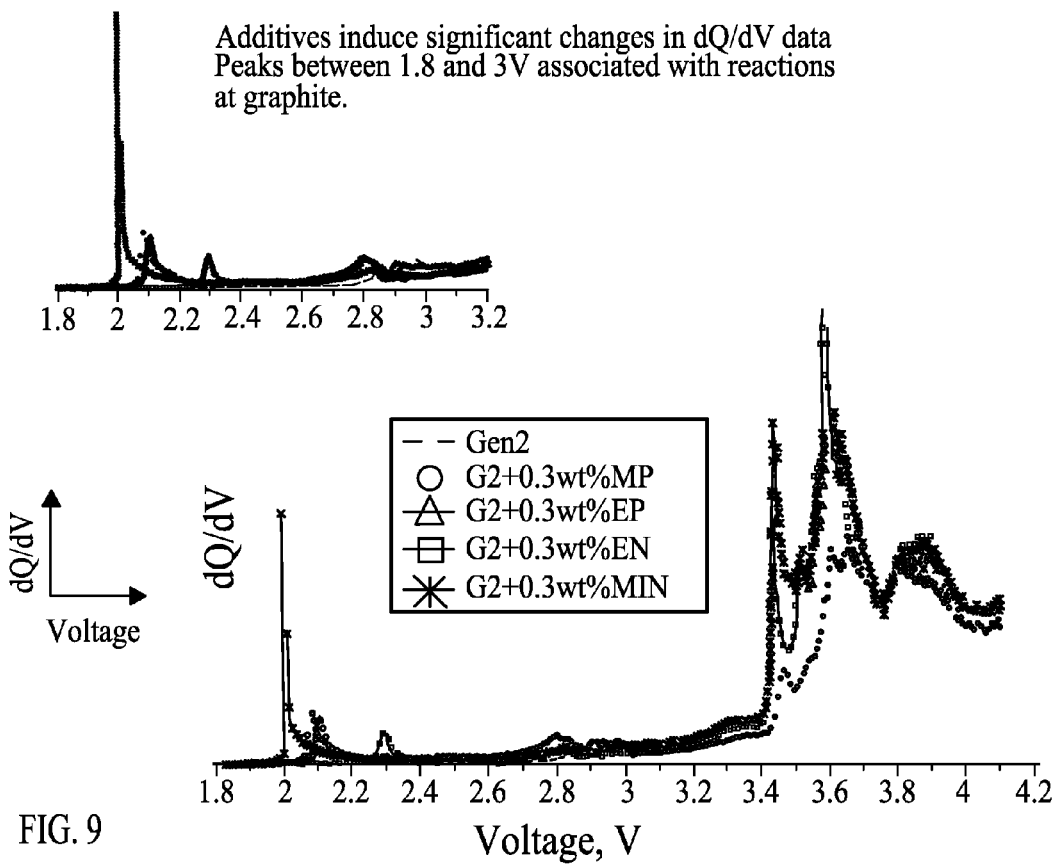
FIG. 9 is a plot of dQ/dV over a voltage range of about 1.8 to about 4.2 volts for cells utilizing electrolytes of the invention containing about 0.3 wt % of various pyridine heteroaromatic compounds, compared to a control electrolyte without any heteroaromatic compound present.

FIG. 9 is a plot of dQ/dV over a voltage range of about 1.8 to about 4.2 volts the cells, which shows that addition of 0.3 wt % of the heteroaromatic compounds to the Gen2 electrolyte induced significant changes between 1.8 V and 3V, indicating that reactions with graphite occurred.

Figure 10:
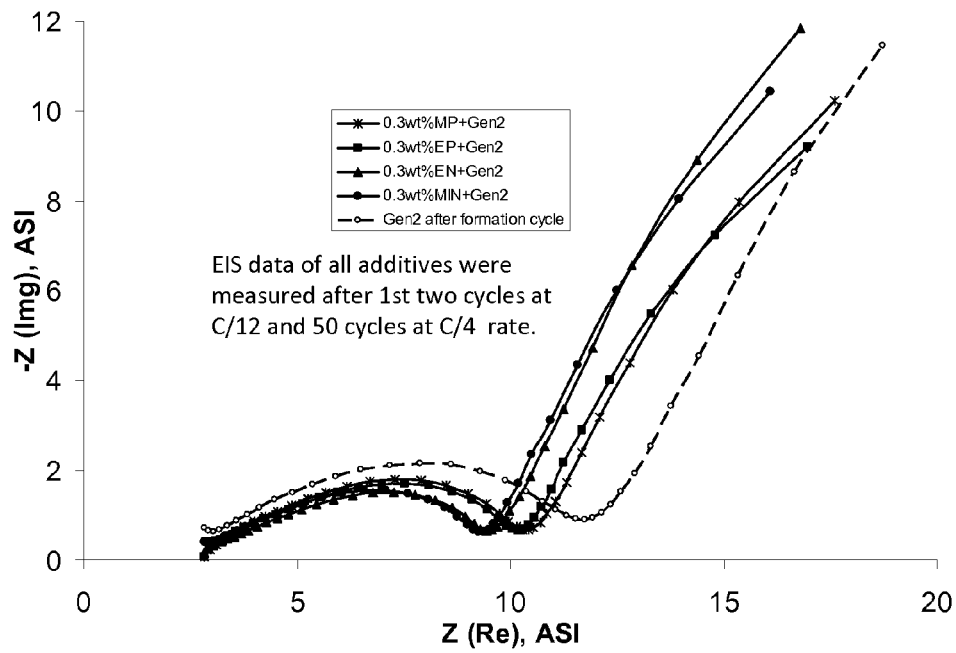
FIG. 10 is a plot of AC impedance data for electrochemical cells utilizing an electrolyte of the invention including about 0.3 wt % of various pyridine heteroaromatic compounds, compared to a control electrolyte without any heteroaromatic compound present.

FIG. 10 is a plot of AC impedance data for the electrochemical cells, which shows that addition of 0.3 wt % of the heteroaromatic compounds to the Gen 2 electrolyte did not significantly alter cell impedance. The electrolytes with added heteroaromatic compounds exhibited either similar or lower impedance.

EXAMPLE 3

Figure 11:
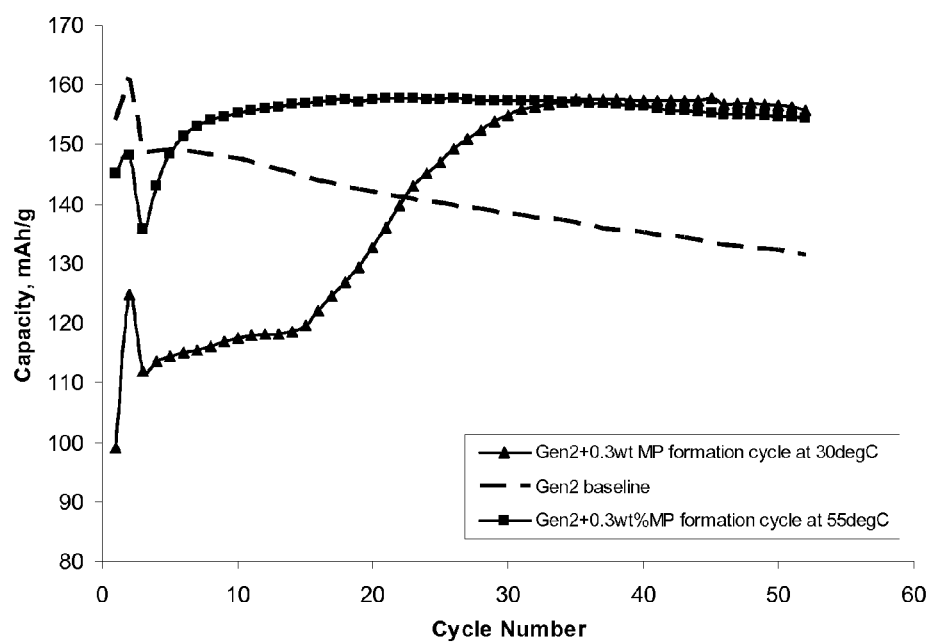
FIG. 11 is a plot of discharge capacity versus cycle number for electrochemical cells utilizing an electrolyte of the invention comprising about 0.3 wt % of methyl picolinate in which the formation cycle was conducted at either 30° C. or 55° C., compared to a control electrolyte without any heteroaromatic compound present.

Electrolytes containing about 0.3 wt % of MP added to the Gen2 electrolyte of Example 1 were evaluated in a cell of the same design as described in Example 1 with the formation cycle being run at about 30° C. or 55° C. FIG. 11 is a plot of discharge capacity versus cycle number for the electrochemical cells compared to the control Gen2 electrolyte. The results in FIG. 11 indicate that the initial capacity of the cell that included MP in the electrolyte increased when the formation cycle was performed at the higher temperature. Capacity improvement is indicative of improved electrode "wetting" by the electrolyte.

EXAMPLE 4

Figure 12:
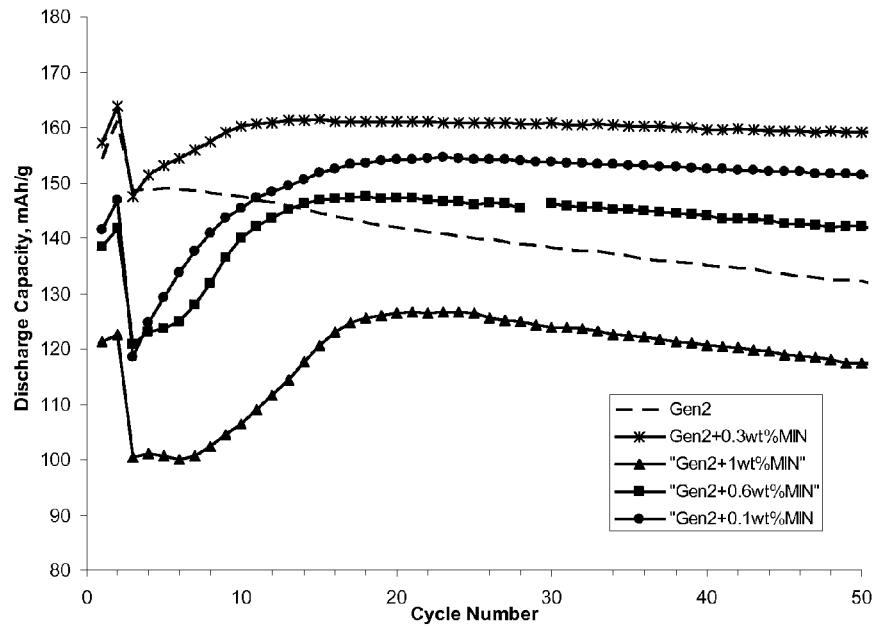
FIG. 12 is a plot of discharge capacity versus cycle number for electrochemical cells utilizing an electrolyte of the invention comprising about 0.1 to about 1 wt % of methyl isonicotinate, compared to a control electrolyte without any heteroaromatic compound present.
Figure 13:
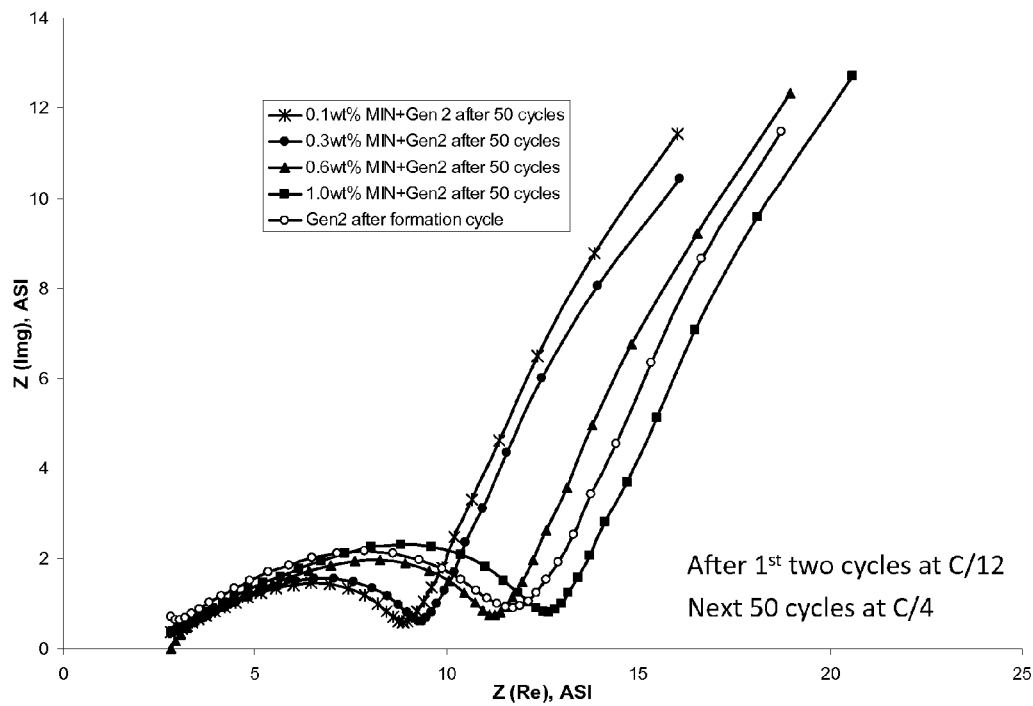
FIG. 13 is a plot of AC impedance data for electrochemical cells utilizing an electrolyte of the invention comprising about 0.1 to about 1 wt % of methyl isonicotinate, compared to a control electrolyte without any heteroaromatic compound present.

Electrolytes containing about 0.1 to about 1 wt % of methyl isonicotinate (MIN) added to the Gen2 electrolyte of Example 1 were evaluated in a cell of the same design as described in Example 1. FIG. 12 is a plot of discharge capacity versus cycle number for electrochemical cells compared to the control Gen2 electrolyte, which demonstrates that addition of about 0.1 to about 0.6 wt % MIN to the Gen2 electrolyte improves cell capacity retention over 50 charge/discharge cycles. FIG. 13 is a plot of AC impedance data for electrochemical cells. The results in FIG. 13 indicate that impedance is smallest for cells with 0.1 to 0.6 wt % MIN. Higher levels of MIN increased the impedance slightly.

EXAMPLE 5

Figure 14:
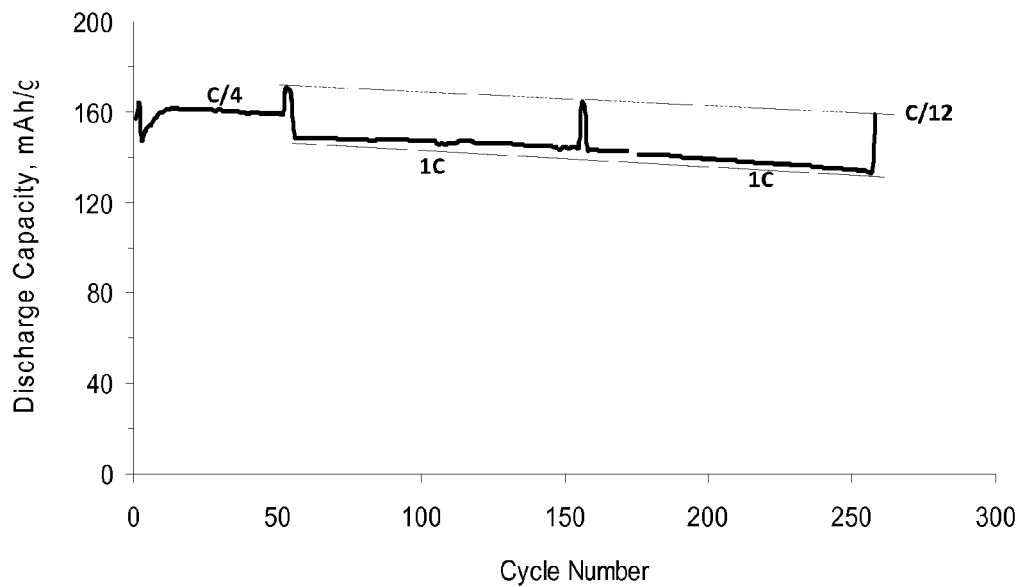
FIG. 14 is a plot of discharge capacity versus cycle number for electrochemical cells utilizing an electrolyte of the invention comprising about 0.3 wt % of methyl isonicotinate, compared to a control electrolyte without any heteroaromatic compound present, over 250 cycles.
Figure 15:
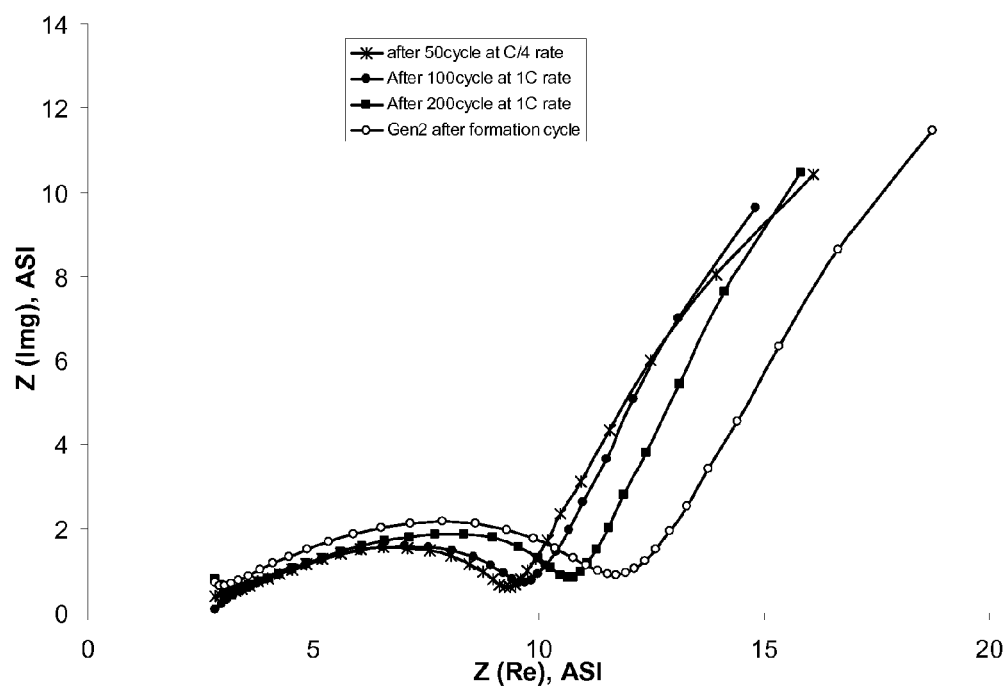
FIG. 15 is a plot of AC impedance data for electrochemical cells utilizing an electrolyte of the invention comprising about 0.3 wt % of methyl isonicotinate, compared to a control electrolyte without any heteroaromatic compound present, over 50, 100, and 200 cycles.

An electrolyte containing about 0.3 wt % of MIN added to the Gen2 electrolyte of Example 1 was evaluated in a cell of the same design as described in Example 1. FIG. 14 is a plot of discharge capacity versus cycle number for electrochemical cells utilizing the MIN-containing electrolyte compared to the control Gen2 electrolyte. Cycles were run at C/4 rate, 1 C rate, and C/12 rate. The results in FIG. 14 indicate that cell capacity retention was about 90% over 200 cycles at 1 C rate, and over 95% when measured at a C/12 rate; that is, the true capacity loss was relatively small for the long-term cycling. FIG. 15 is a plot of AC impedance data for electrochemical cells over 50 cycles at C/4 rate, 100 cycles at 1 C rate, and 200 cycles at 1 C rate. The cells containing 0.3 wt % MIN exhibited minimal impedance increase after 200 cycles at 1 C rate.

EXAMPLE 6

Figure 16:
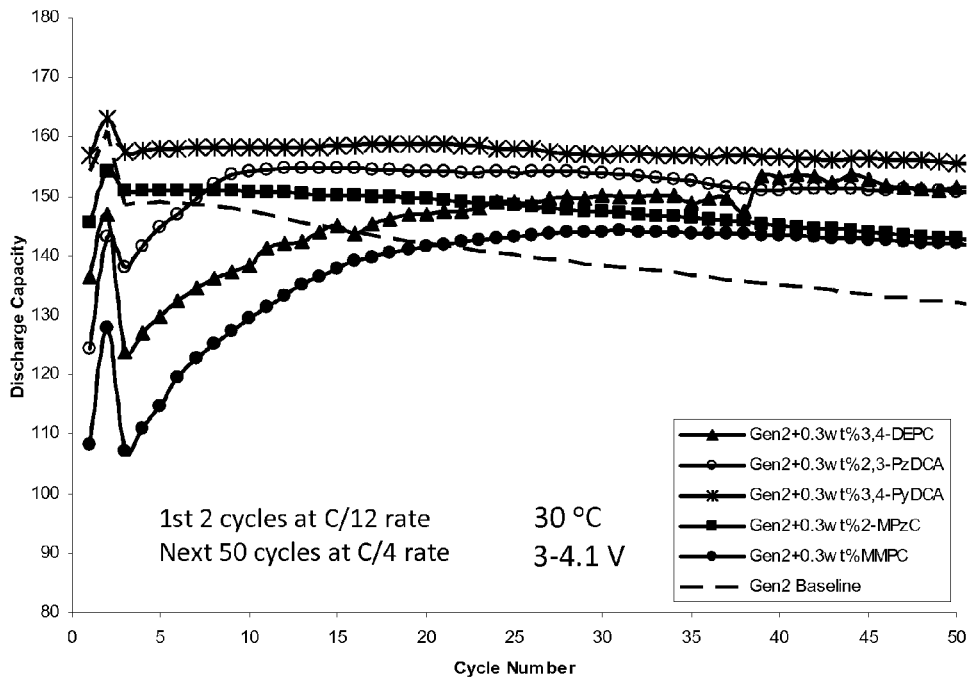
FIG. 16 is a plot of discharge capacity versus cycle number for electrochemical cells utilizing an electrolyte of the invention comprising about 0.3 wt % of various pyridine, pyrazine, and pyrrole heteroaromatic compounds, compared to a control electrolyte without any heteroaromatic compound present.

Electrolytes containing about 0.3 wt % of 3,4-diethyl pyridinecarboxylate (3,4-DEPC), 3,4-diethyl pyridinecarboxylic anhydride (3,4-PyDCA), 2,3-pyridinecarboxylic anhydride (2,3-PyDCA), 2,3-pyrazinecarboxylic anhydride (2,3-PzDCA), methyl-2-pyrazinecarboxylate (2-MPzC), or methyl-1-methylpyrrole-2-carboxylate (MMPC) added to the Gen2 electrolyte of Example 1 were evaluated in a cell of the same design as described in Example 1. FIG. 16 is a plot of discharge capacity versus cycle number for the electrochemical cells, compared to the control Gen2 electrolyte, which demonstrates that 0.3 wt % of the added heteroaromatic compounds 3,4-DEPC, 2,3-PzDCA, 3,4-PyDCA, 2-MPzC and MMPC improved the capacity retention. 3,4-PyDCA provided the best performance in terms of initial capacity loss.

EXAMPLE 7

Figure 17:
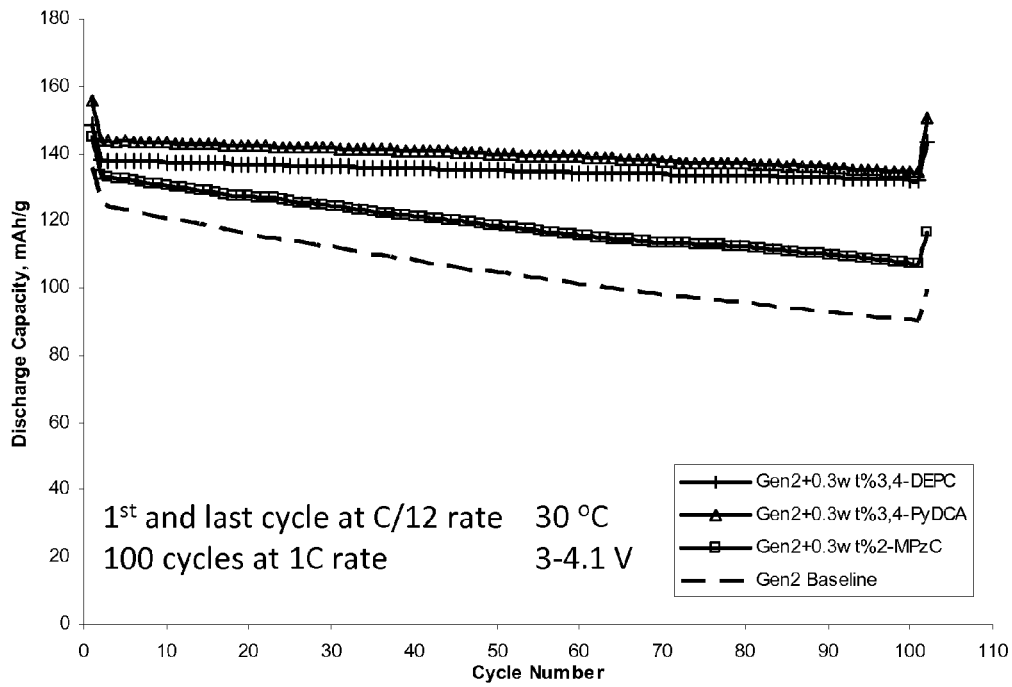
FIG. 17 is a plot of discharge capacity versus cycle number for electrochemical cells utilizing an electrolyte of the invention comprising about 0.3 wt % of various pyridine and pyrazine heteroaromatic compounds, compared to a control electrolyte without any heteroaromatic compound present, over 100 cycles.

Electrolytes containing about 0.3 wt % of 3,4-DEPC, 3,4-PyDCA, or 2-MPzC added to the Gen2 electrolyte of Example 1 were evaluated in a cell of the same design as described in Example 1. FIG. 17 is a plot of discharge capacity versus cycle number for electrochemical cells compared to the control Gen2 electrolyte over 100 cycles, which indicates that 0.3 wt % of 3,4-DEPC or 3,4-PyDCA added to Gen2 electrolyte provided more than 95% capacity retention a 1 C rate over 100 cycles. The cell including 2-MPzC did not perform as well at 1 C rate.

EXAMPLE 8

Figure 18:
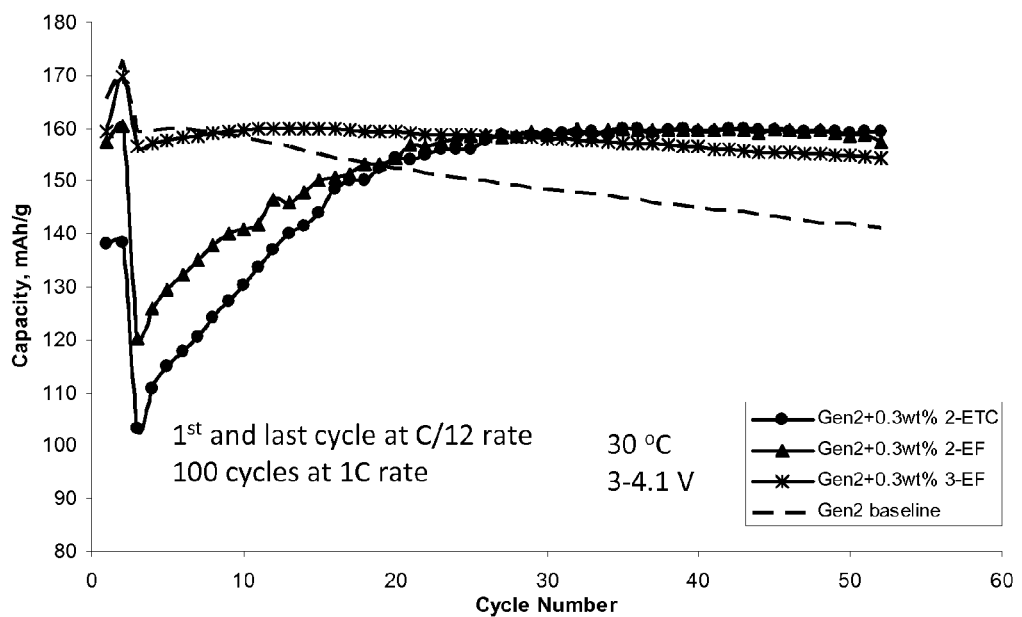
FIG. 18 is a plot of capacity versus cycle number for electrochemical cells utilizing an electrolyte of the invention comprising about 0.3 wt % of various furan and thiophene heteroaromatic compounds, compared to a control electrolyte without any heteroaromatic compound present.

Electrolytes containing about 0.3 wt % of 2-ethyl furoate (2-EF), 3-ethyl furoate (3-EF), or 2-ethyl thiophenecarboxylate (2-ETC) added to the Gen2 electrolyte of Example 1 were evaluated in a cell of the same design as described in Example 1. FIG. 18 is a plot of capacity versus cycle number for the electrochemical cells compared to the control Gen2 electrolyte. The results in FIG. 18 show that addition of about 0.3 wt % of these furan and thiophene heteroaromatic compounds to the Gen2 electrolyte improved capacity retention. Evaluations of electrolytes containing about 2 wt % added heteroaromatic compound provided similar results.

Figure 19:
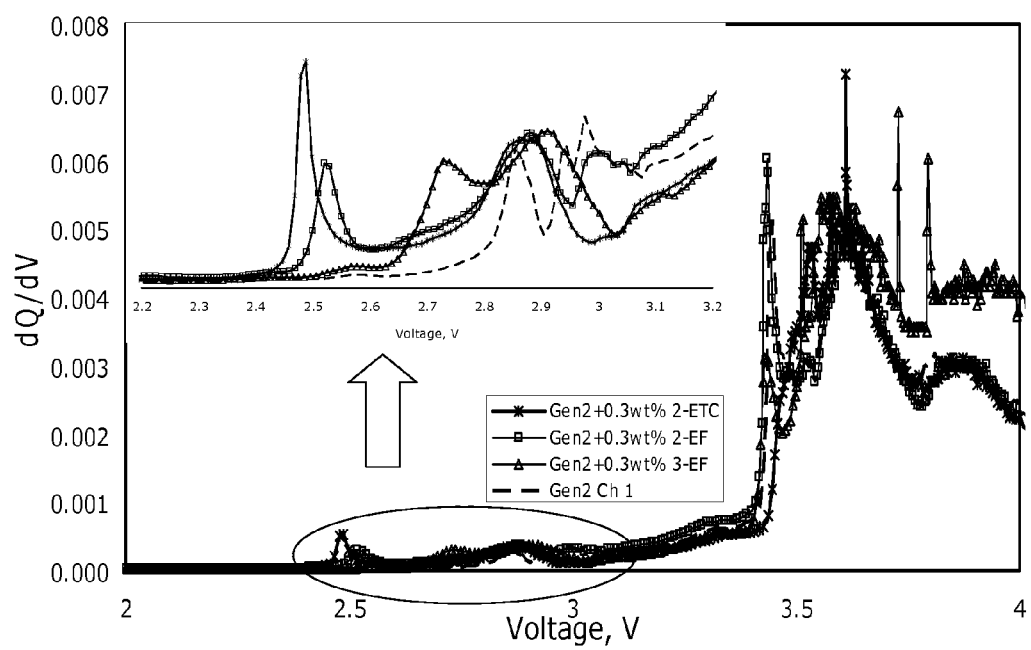
FIG. 19 is a plot of dQ/dV over a voltage range of about 1.8 to about 4.2 volts for electrolytes of the invention containing about 0.3 wt % of various furan and thiophene heteroaromatic compounds, compared to a control electrolyte without any heteroaromatic compound present.
Figure 20:
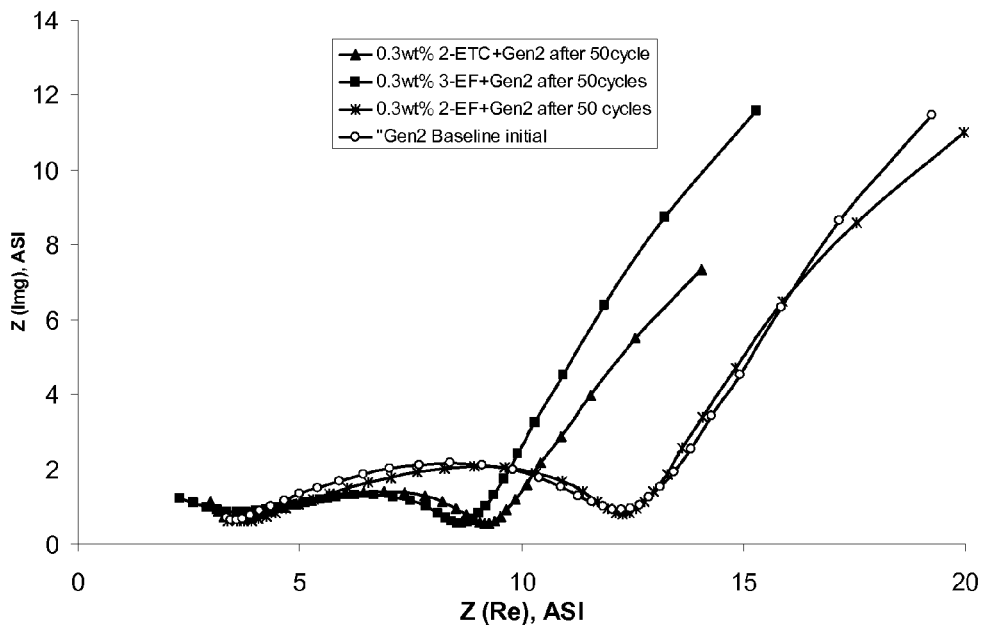
FIG. 20 is a plot of AC impedance data for electrochemical cells utilizing an electrolyte of the invention comprising about 0.3 wt % of various furan and thiophene heterocyclic compounds, compared to a control electrolyte without any heteroaromatic compound present.

FIG. 19 is a plot of dQ/dV over a voltage range of about 1.8 to about 4.2 volts for the electrolytes compared to the control Gen2 electrolyte, which demonstrates that the added heteroaromatic compounds induced significant changes in the dQ/dV data between 2.4 and 3 V, which is indicative of reactions at graphite. FIG. 20 is a plot of AC impedance data for electrochemical cells compared to the control Gen2 electrolyte. The results in FIG. 20 show that 0.3 wt % of the heteroaromatic compounds added to Gen2 electrolyte did not significantly alter the cell impedance. The cells containing the heteroaromatic compounds exhibited similar or lower impedance that the cells utilizing the Gen2 electrolyte.

EXAMPLE 9

Figure 21:
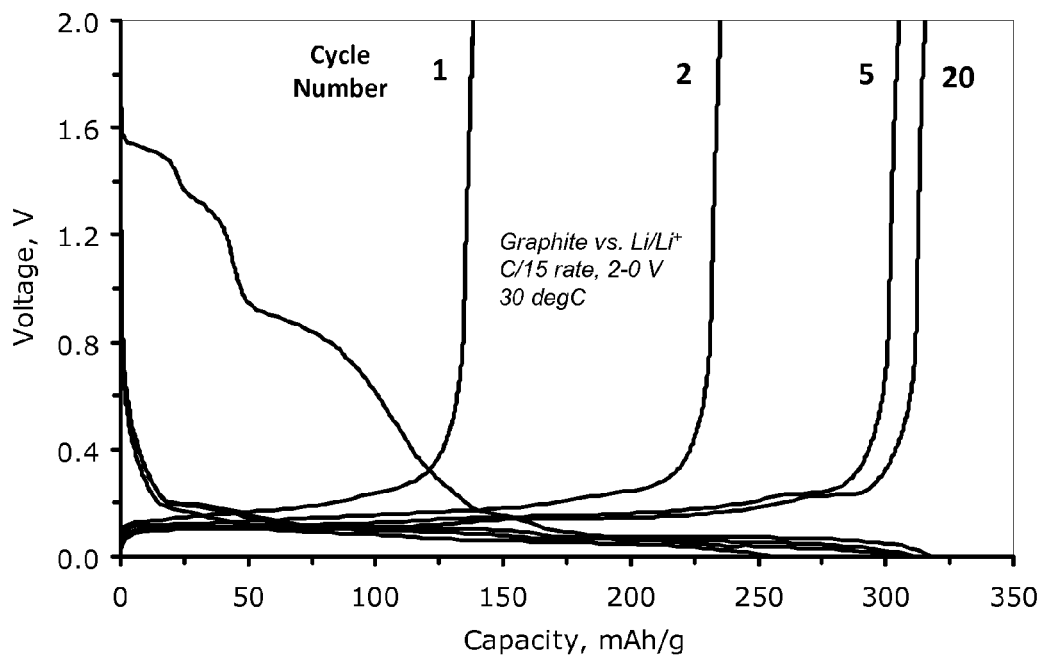
FIG. 21 is a plot of voltage versus capacity for a graphite electrode in an electrolyte of the invention containing 1.2 M $LiPF_6$ in a 1:8 (w/w) mixture of ethyl picolinate and DMC.
Figure 22:
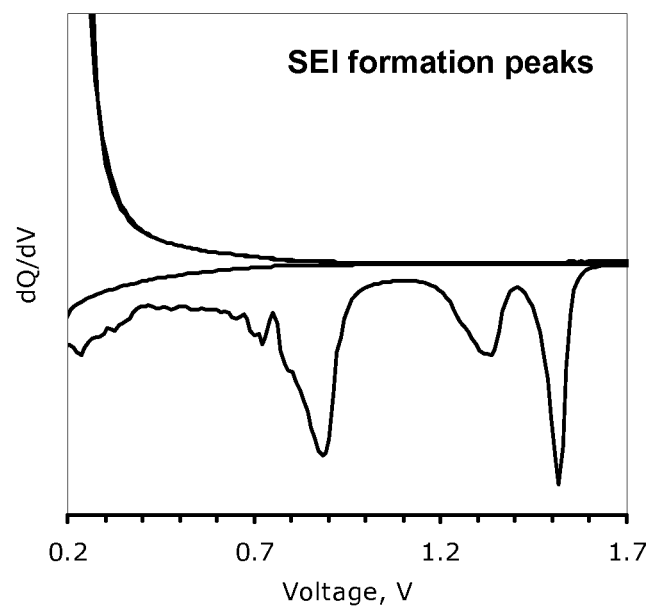
FIG. 22 is a plot of dQ/dV over a voltage range of about 0.2 to about 1.7 volts for a graphite electrode in an electrolyte an electrolyte of the invention containing 1.2 M $LiPF_6$ in a 1:8 (w/w) mixture of ethyl picolinate and DMC, showing solid electrolyte interphase (SEI) formation.
Figure 23:
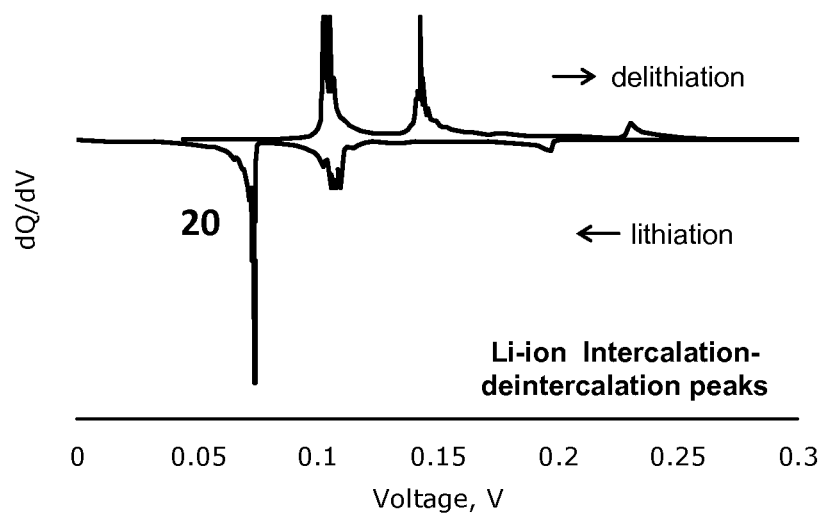
FIG. 23 is a plot of dQ/dV over a voltage range of about 0 to about 0.3 volts for a graphite electrode in an electrolyte of the invention containing 1.2 M $LiPF_6$ in a 1:8 (w/w) mixture of ethyl picolinate and DMC, showing lithiation and delithiation.

Electrolytes containing about 1.2 M LiPF$_6$ in a 1:8 mixture of ethyl picolinate (EP) and dimethyl carbonate (DMC) were evaluated in a cell comprising a graphite electrode and a Li metal counter electrode. FIG. 21 is a plot of voltage versus capacity for cycles 1, 2, 5, and 20. The results in FIG. 21 indicate that graphite electrodes can be cycled in EP-based electrolytes in the absence of ethylene carbonate. FIG. 22 is a plot of dQ/dV over a voltage range of about 0.2 to about 1.7 volts, showing solid electrolyte interphase (SEI) formation. FIG. 23 is a plot of dQ/dV over a voltage range of about 0 to about 0.3 volts, showing lithiation and delithiation. Electrolyte reduction peaks were only observed during the first lithiation cycle. The observed increased capacity with cycling may be due to improved electrode wetting.

Figure 24:
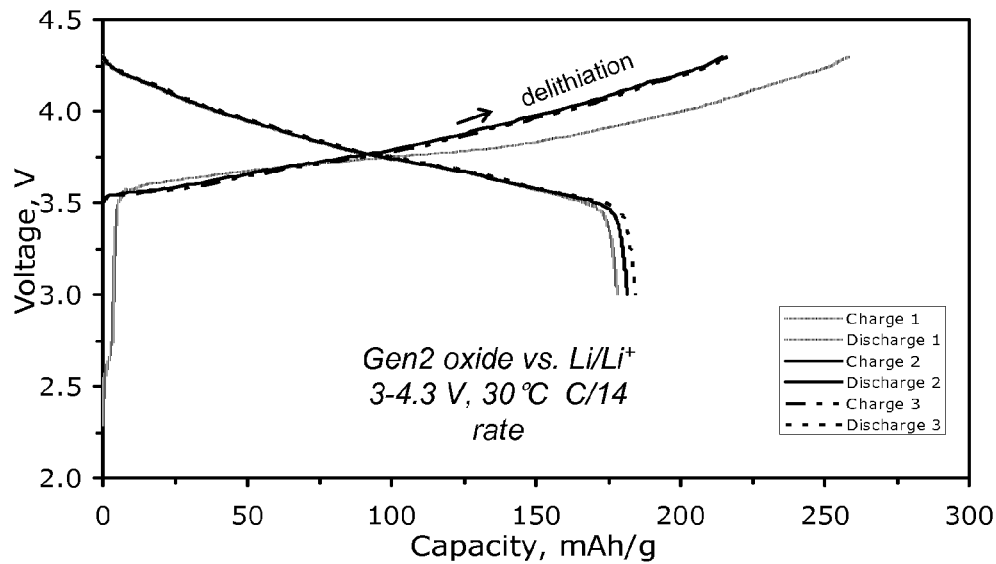
FIG. 24 is a plot of voltage versus capacity over three charge/discharge cycles for an oxide electrode in an electrolyte of the invention containing 1.2 M $LiPF_6$ in a 1:8 (w/w) mixture of ethyl picolinate and DMC, over three charge/discharge cycles.
Figure 25:
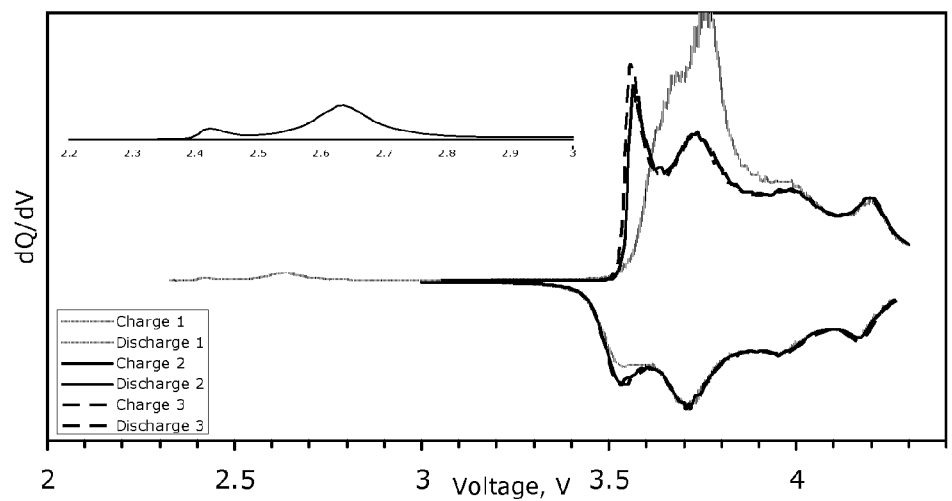
FIG. 25 is a plot of dQ/dV over a voltage range of about 2 to about 4.4 volts for an oxide electrode in an electrolyte of the invention containing 1.2 M $LiPF_6$ in a 1:8 (w/w) mixture of ethyl picolinate and DMC, over three charge/discharge cycles.

The same electrolyte was evaluated in a cell with an oxide electrode (LiNi$_{0.8}$Co$_{0.15}$Al$_{0.05}$O$_2$) and a Li metal counter electrode. FIG. 24 is a plot of voltage versus capacity over three charge/discharge cycles for the oxide electrode over three charge/discharge cycles. FIG. 25 is a plot of dQ/dV over a voltage range of about 2 to about 4.3 volts over three charge/discharge cycles. The results demonstrate that the oxide electrodes can be cycled in EP-based electrolytes, albeit with some Li consumption during the first cycle. After 10 cycles, the electrochemical efficiency was about 86%, which may be due to a slow electrolyte oxidation during cycling.

Figure 26:
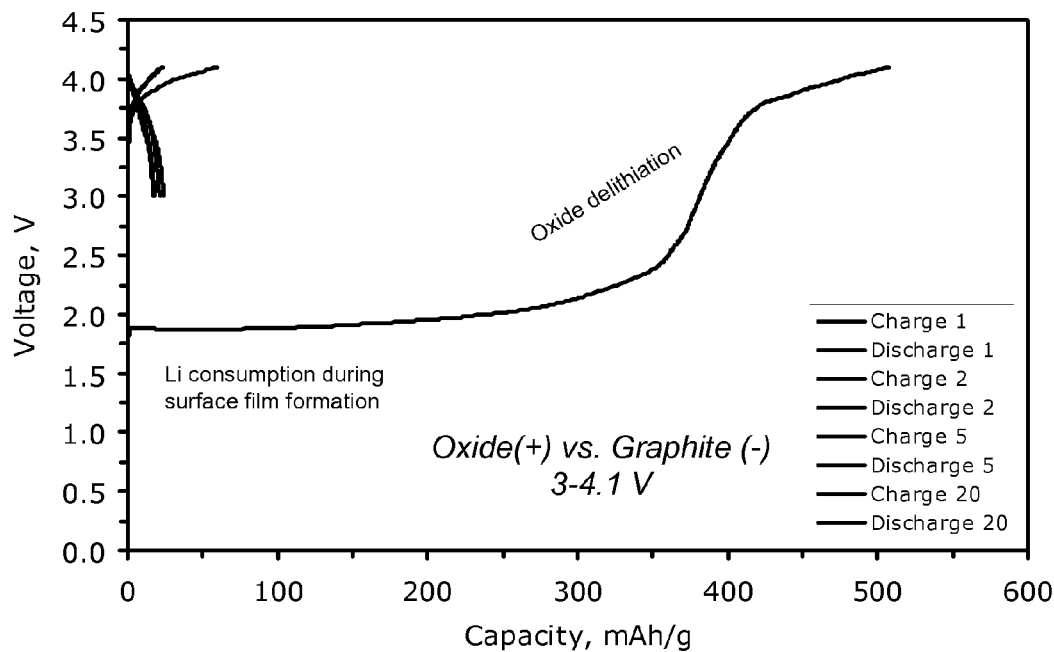
FIG. 26 is a plot of voltage versus capacity for a graphite/oxide cell utilizing an electrolyte of the invention containing 1.2 M $LiPF_6$ in a 1:8 (w/w) mixture of ethyl picolinate and DMC, over 20 charge/discharge cycles.

FIG. 26 is a plot of voltage versus capacity for an oxide/graphite cell utilizing the same electrolyte, over 20 charge/discharge cycles. The data in FIG. 26 indicate that Li consumption during EP decompositions may deplete the lithium inventory in a full cell during the first cycle. Although low, the capacity remained stable during subsequent cycles.

EXAMPLE 10

Figure 27:
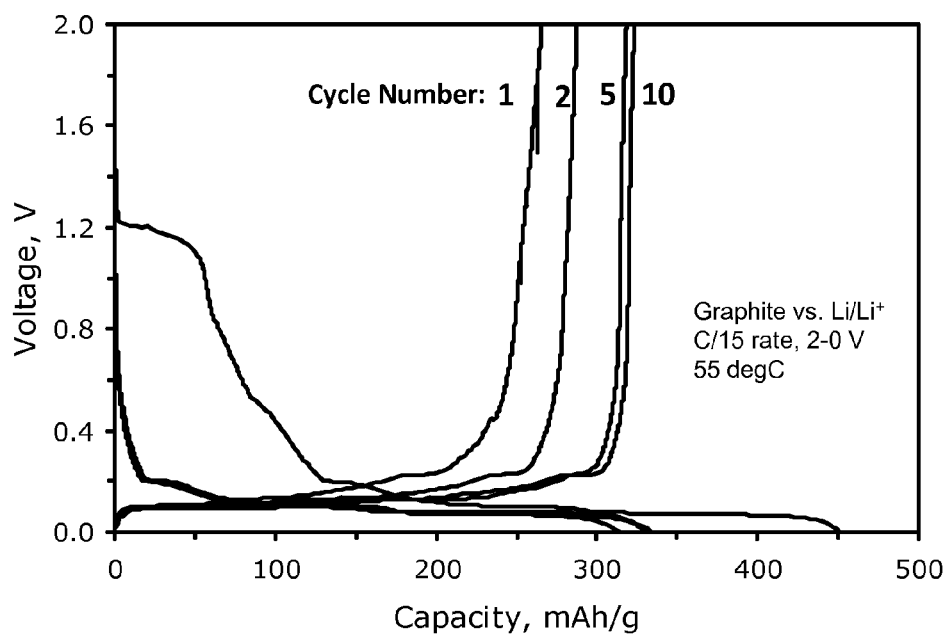
FIG. 27 is a plot of voltage versus capacity for a graphite electrode in an electrolyte of the invention containing 1.2 M $LiPF_6$ in a 1:8 (w/w) mixture of 3-ethyl furoate and DMC.
Figure 28:
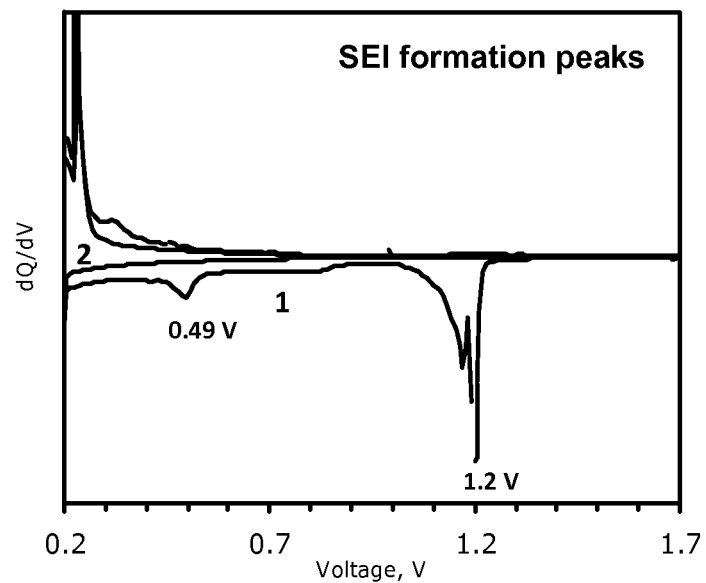
FIG. 28 is a plot of dQ/dV over a voltage range of about 0.2 to about 1.7 volts for a graphite electrode in an electrolyte of the invention containing 1.2 M $LiPF_6$ in a 1:8 (w/w) mixture of 3-ethyl furoate and DMC, showing SEI formation.
Figure 29:
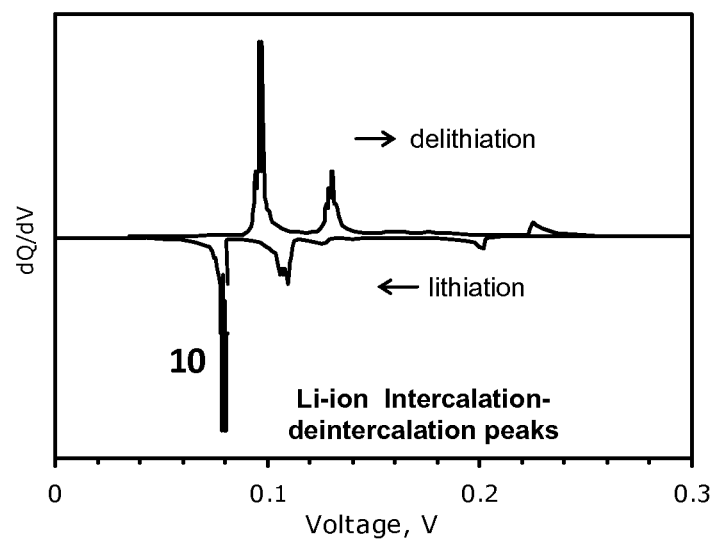
FIG. 29 is a plot of dQ/dV over a voltage range of about 0 to about 0.3 volts for a graphite electrode in an electrolyte of the invention containing 1.2 M $LiPF_6$ in a 1:8 (w/w) mixture of 3-ethyl furoate and DMC, showing lithiation and delithiation.

Electrolytes containing about 1.2 M LiPF$_6$ in a 1:8 mixture of 3-ethyl furoate (3-EF) and dimethyl carbonate (DMC) were evaluated in a cell comprising a graphite electrode. FIG. 27 is a plot of voltage versus capacity. FIG. 28 is a plot of dQ/dV over a voltage range of about 0.2 to about 1.7 volts, showing SEI formation. FIG. 29 is a plot of dQ/dV over a voltage range of about 0 to about 0.3 volts, showing lithiation and delithiation. These results indicate that graphite electrodes can be cycled in 3-EF-based electrolytes that are free from ethylene carbonate. Electrolyte reduction was only observed during the first lithiation cycle. After 5 cycles, the capacity values stabilized.

Figure 30:
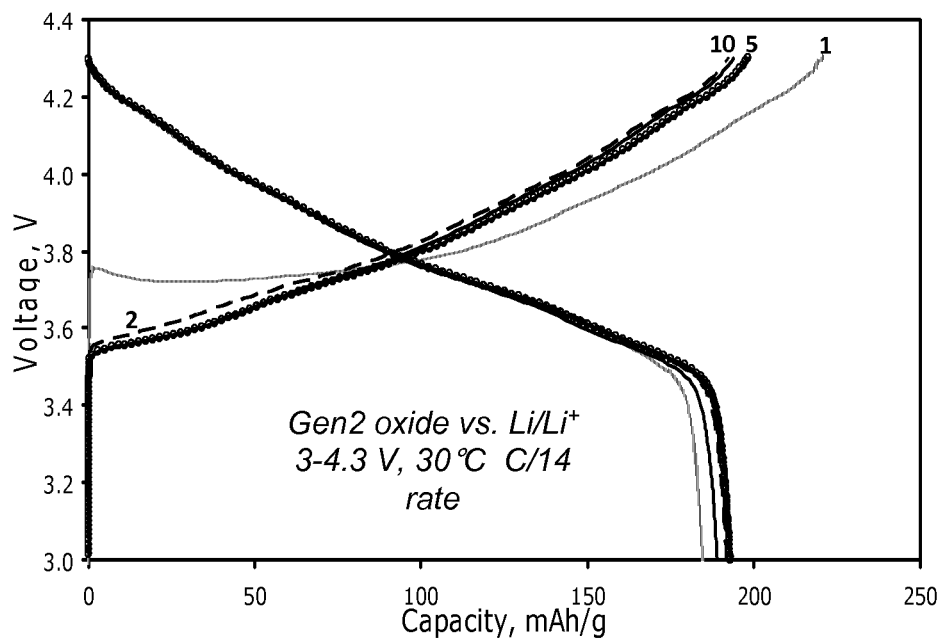
FIG. 30 is a plot of voltage versus capacity for an oxide electrode in an electrolyte of the invention containing 1.2 M $LiPF_6$ in a 1:8 (w/w) mixture of 3-ethyl furoate and DMC, over 10 charge/discharge cycles.
Figure 31:
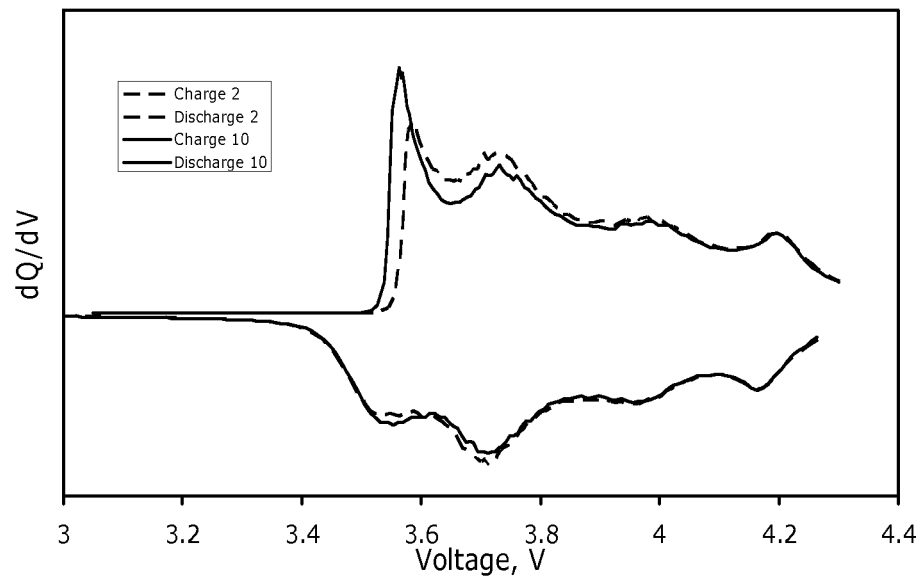
FIG. 31 is a plot of dQ/dV over a voltage range of about 3 to about 4.3 volts for an oxide electrode in an electrolyte of the invention containing 1.2 M $LiPF_6$ in a 1:8 (w/w) mixture of 3-ethyl furoate and DMC, over 10 charge/discharge cycles.

FIG. 30 is a plot of voltage versus capacity for an oxide electrode (LiNi$_{0.8}$Co$_{0.15}$Al$_{0.05}$O$_2$) in the same electrolyte over 10 charge/discharge cycles. The results in FIG. 30 show that oxide electrodes can be cycled in a 3-EF-based electrolyte. Some lithium consumption was observed during the first cycle. Coulombic efficiency was greater than 98%. FIG. 31 is a plot of dQ/dV over a voltage range of about 3 to about 4.3 volts for the oxide electrode over 10 charge/discharge cycles. No unusual peaks were observed in the dQ/dV data, indicating that little if any oxidation of the electrolyte occurred.

Electrochemical Cells and Batteries.

Figure 32:
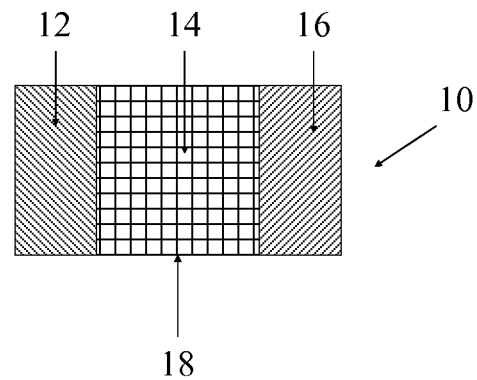
FIG. 32 depicts a schematic representation of an electrochemical cell.
Figure 33:
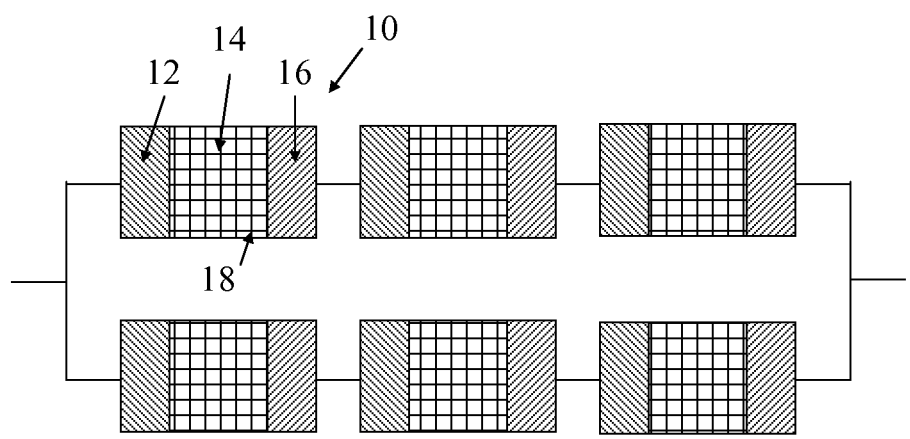
FIG. 33 depicts a schematic representation of a battery consisting of a plurality of cells connected electrically in series and in parallel.

Electrochemical cells and batteries comprising the electrolytes of this invention are schematically illustrated in FIG. 32 and FIG. 33. FIG. 32 illustrates an electrochemical cell 10 having a negative electrode 12 separated from a positive electrode 16 by an electrolyte of the invention 14, all contained in an insulating housing 18 with suitable terminals (not shown) being provided in electronic contact with the negative electrode 12 and the positive electrode 16.

Binders and other materials normally associated with both the electrolyte and the negative and positive electrodes are well known in the art and are not described herein, but are included as is understood by those of ordinary skill in this art. FIG. 33 shows a schematic illustration of one example of a battery in which two strings of electrochemical lithium cells 10, described above, are arranged in parallel, each string comprising three cells arranged in series.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The embodiments of the invention in which an exclusive property or privilege is claimed are defined as follows:

1. An electrolyte composition suitable for use in a lithium battery, a lithium-ion battery, or both; the electrolyte composition comprising a lithium salt in a liquid carrier comprising a heteroaromatic compound including a five-membered or six-membered heteroaromatic ring moiety selected from the group consisting of 3-ethyl furoate, a triazine, and a pyrrole the heteroaromatic ring moiety bearing at least one carboxylic ester or carboxylic anhydride substituent bound to at least one carbon atom of the heteroaromatic ring.

2. The electrolyte composition of claim 1 wherein the lithium salt comprises $LiPF_6$, $LiBF_4$, $LiF_2BC_2O_4$, $LiB(C_2O_4)_2$, $LiClO_4$, $LiAsF_6$, $LiN(SO_2CF_3)_2$, $LiC(SO_2CF_3)_3$, $LiSO_3CF_3$, $LiPF_3(CF_2CF_3)_3$, or any combination of two or more thereof.

3. The electrolyte composition of claim 1 wherein the lithium salt is present at a concentration in the range of about 0.1 to about 5 M.

4. The electrolyte composition of claim 1 wherein the lithium salt is present at a concentration in the range of about 1 to about 1.5 M.

5. The electrolyte composition of claim 1 wherein the liquid carrier also comprises at least one additional organic solvent.

6. The electrolyte composition of claim 1 wherein the liquid carrier also comprises at least one organic carbonate solvent selected from the group consisting of ethylene carbonate, propylene carbonate, dimethylcarbonate, and ethylmethylcarbonate.

7. The electrolyte of claim 1 wherein the heteroaromatic compound comprises a pyrrole moiety, and is represented by general Formula (IV):

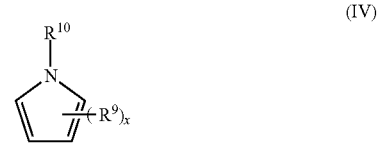

(IV)

wherein x is 1, 2, 3, or 4; each $R^9$ is attached to a carbon atom of the pyrrole moiety and independently is selected from the group consisting of alkyl, alkenyl, alkynyl, aryl, arylalkyl, fluoroalkyl, fluoroalkenyl, fluoroalkynyl, fluoroaryl, fluoroarylalkyl, a carboxylic anhydride, and a carboxylic ester selected from the group consisting of an alkyl ester, an alkenyl ester, an alkynyl ester, an aryl ester, an arylalkyl ester, a fluoroalkyl ester, a fluoroalkenyl ester, a fluoroalkynyl ester, a fluoroaryl ester, and a fluoroarylalkyl ester; optionally $R^9$ substituents on two adjacent C atoms together form a cyclic carboxylic anhydride group; $R^{10}$ is selected from the group consisting of H, alkyl, alkenyl, alkynyl, aryl, arylalkyl, fluoroalkyl, fluoroalkenyl, fluoroalkynyl, fluoroaryl, and fluoroarylalkyl; and the compound bears at least one $R^9$ substituent selected from a carboxylic anhydride and a carboxylic ester.

8. The electrolyte of claim 7 wherein x is 1 or 2 and each $R^9$ substituent is selected from a carboxylic ester and a carboxylic anhydride, or two adjacent $R^9$ substituents together form a cyclic anhydride; and $R^{10}$ is selected from H and $C_1$ to $C_4$ alkyl.

9. The electrolyte of claim 8 wherein the carboxylic ester is a $C_1$ to $C_4$ alkyl carboxylic ester.

10. An electrochemical cell comprising an anode, a cathode, and an electrolyte of claim 1 in contact with the anode and the cathode.

11. A battery comprising a plurality of electrochemical cells of claim 10 arranged in series, in parallel, or both.

* * * * *